United States Patent [19]

Hrusecky

[11] Patent Number: 4,845,659
[45] Date of Patent: Jul. 4, 1989

[54] ACCELERATED VALIDITY RESPONSE PERMITTING EARLY ISSUE OF INSTRUCTIONS DEPENDENT UPON OUTCOME OF FLOATING POINT OPERATIONS

[75] Inventor: David A. Hrusecky, Endicott, N.Y.

[73] Assignee: International Business Machines Corporation, Armonk, N.Y.

[21] Appl. No.: 896,879

[22] Filed: Aug. 15, 1986

[51] Int. Cl.[4] ............... G06F 15/00; G06F 15/20; G06F 15/31; G06F 15/32

[52] U.S. Cl. ............... 364/900; 364/937.1; 364/937.8

[58] Field of Search ... 364/200 MS File, 900 MS File, 364/200, 900, 715, 736, 748

[56] References Cited

U.S. PATENT DOCUMENTS

| | | | |
|---|---|---|---|
| 3,551,665 | 9/1966 | Powers et al. | 235/175 |
| 3,881,173 | 4/1975 | Larsen et al. | 340/172.5 |
| 4,338,675 | 7/1982 | Palmer et al. | 364/748 |
| 4,542,456 | 9/1985 | Hill | 364/200 |
| 4,573,118 | 2/1986 | Damouny et al. | 364/200 |
| 4,683,546 | 7/1987 | Boney | 364/748 |

OTHER PUBLICATIONS

"The IBM System/360 Model 91: Machine Philosophy and Instruction-Handling", by D. W. Anderson et al., IBM Journal, Jan. 1967.
"An Efficient Algorithm for Exploiting Multiple Arithmetic Units", by R. M. Tomasulo, IBM Journal, Jan. 1967.
"The IBM System/360 Model 91: Floating-Point Execution Unit", by S. F. Anderson et al., IBM Journal, Jan. 1967.

*Primary Examiner*—Archie E. Williams, Jr.
*Assistant Examiner*—Robert B. Harrell
*Attorney, Agent, or Firm*—Baker, Maxham, Jester & Meador

[57] ABSTRACT

Apparatus and method for accelerating a validity response provided by a floating point unit assures the validity of the present state of a condition code and an interrupt signal before the completion of a floating point arithmetic instruction whose result affects the condition code and interrupt signal. The accelerated validity response is derived from an evaluation of the exponents, signs, and fractions contained in the operands of a currently-executing floating point arithmetic operation which is made prior to or during execution of the instruction. Also provided is the capability of setting the condition code prior to the completion of certain add class floating point instructions where one of those instructions stimulates an early validity response. An accelerated interrupt request is also provided in synchronism with an accelerated validity response for certain floating point add and subtract instructions.

6 Claims, 10 Drawing Sheets

BINARY DIGITS  B0  B1 · · · B7  B8 · · · B31  B32 · · · B63
                SIGN  CHARACTERISTIC
                              "SHORT" OPERATION
                                  FRACTION
                                    "LONG" OPERATION
                                        FRACTION

HEXADECIMAL  H0 H1  H2 · · · H7  H8 · · · H15
   DIGITS
          SIGN &
       CHARACTERISTIC
              "SHORT" FRACTION
                    "LONG" FRACTION

FLOATING POINT INSTRUCTION

ACCELERATED VALIDITY RESPONSE PERMITTING EARLY ISSUE OF INSTRUCTIONS DEPENDENT UPON OUTCOME OF FLOATING POINT OPERATIONS

RELATED, CO-PENDING PATENT APPLICATIONS

This patent application includes material related to the following co-pending patent applications, all of which are assigned to the assignee of this application:

U.S. patent application Ser. No. 06/915,423, filed, Oct. 6, 1986, and entitled "EXTENDED FLOATING POINT OPERATIONS SUPPORTING EMULATION OF SOURCE INSTRUCTION EXECUTION";

U.S. patent application Ser. No. 873,731, filed June 12, 1986, and entitled "A SEQUENCE CONTROLLER OF AN INSTRUCTION PROCESSING UNIT FOR PLACING SAID UNIT IN A READY, GO, HOLD, OR CANCEL STATE"; and U.S. patent application Ser. No. 909,431, filed Sept. 19, 1986, and entitled "AN INPUT OUTPUT INTERFACE CONTROLLER CONNECTING A SYNCHRONOUS BUS TO AN ASYNCHRONOUS BUS AND METHODS FOR PERFORMING OPERATIONS ON THE BUSSES". All of the cross-referenced, co-pending patent applications are incorporated herein by reference.

TECHNICAL FIELD

This invention relates to an apparatus and method for accelerating the validity response of a floating point arithmetic unit to floating point instructions issued to the unit by an instruction issuing entity. More specifically, the invention relates to accelerating a validity response normally provided by a floating point arithmetic unit to such an instruction issuing entity only upon the completion of each floating point instruction provided to the unit by the entity, with the provision of the validity response being advanced to a time prior to the completion of the instruction to which it pertains.

Floating point arithmetic has been implemented as a high-precision adjunct to computing systems at least since the introduction of the IBM System/360. A computing means having the capability of performing floating point arithmetic is found in the IBM System/370 computing system described in U.S. Pat. No. 3,400,371 of Amdahl et al., issued Sept. 3, 1960, and incorporated herein by reference.

Floating point arithmetic is used, primarily in scientific calculations, when numbers of different magnitudes are to be combined. The binary representation of a floating point number is illustrated in FIG. 1 and includes 32 bits, B0–B31, or 64 bits, B0–B63, the first representation being used for short operations, and the second for long operations. As is known, for short and long operations, the first bit B0 represents the algebraic sign of the number represented: when bit B0 is a 0, the sign is taken as positive, when 1, the sign is negative. The next 7 bits, B1–B7, represent the characteristic of the number. In this regard, the characteristic indicates a power, or exponent of 2. Finally, in the case of short operations, the bits B8–B31 are the binary representation of the magnitude of a fraction having a value contained in the range (1,0]. In long operations, the fraction is contained in the same range, but represented with greater precision by the additional 32 bits. The number embodied in the floating point representation is considered to be the product of 2 raised to the power represented by the characteristic, and the fraction.

Characteristically, floating point numbers are expressed in hexadecimal form as illustrated in FIG. 2. In the hexadecimal number of FIG. 2, the first two hexadecimal digits, H0 and H1, correspond to the first 8 binary digits, B0–B7, of the binary number illustrated in FIG. 1. The binary short operation fraction of FIG. 1, B8–B31, is represented by H2–H7 of the FIG. 2 representation. Similarly, a long fraction is represented hexadecimally by the digits H2–H15.

As will be appreciated by one skilled in the art, a floating point "operation" is a specific operational sequence invoked by a floating point "instruction." Typically, in the IBM System/370, a floating point instruction has the form illustrated in FIG. 3 with an operation field (OP) and two operand fields (FA and FB). In response to a floating point instruction, the System/370 will perform the operation indicated by the OP field on a pair of operands contained in floating point registers FA and FB, and will return the results to the floating point register FA.

The normal complement of floating point instructions in the IBM System/370 includes "add class" instructions, multiply instructions, divide instructions, and other specialized instructions including compare and square root. "Add class" instructions include long and short addition and subtraction, normalized or unnormalized.

The operational sequence for normalized add class instructions includes at least three steps. In the first step, characteristics of the operands that are to be subjected to the operation are compared. In this regard, the fractions of the two operands upon which the operation is to be performed are aligned by comparing the operands. The fraction of the operand with the smaller characteristic is right-shifted through the number of hexadecimal digits required to equalize the characteristics of the operands. Next, the add class operation is performed, meaning the fraction of the operand in register FB is added to or subtracted from the fraction in the register FA. Finally, the fraction of the resulting number is inspected. If its high order digit is 0, the fraction is left-shifted until its highest order digit is non-zero. Simultaneously, the characteristic is reduced by an amount corresponding to the number of digits through which the most significant non-zero fraction must be shifted in order to place it in the highest order digit. In unnormalized add class operations, the third step- normalization- is omitted.

In floating point multiply and divide operations, the operational sequence consists of a prenormalization step in which both operands are normalized in the manner described above for the add class operations. Next, the characteristics of the operands are added or subtracted and the fractions combined according to whether the required operation is a multiply or divide. Finally, a postnormalization step is executed as described above for the add class normalization if the upper digit of the resulting fraction is 0.

Floating point compare operations are essentially subtractions, which are normally performed by an adapted floating point subtraction operation. Similarly, square root operations are normally performed in the floating point context by a modified division sequence.

It is accepted practice to represent floating point operations in the hexadecimal characteristics, and this practice will be followed in the description below of the invention. Therefore, during normalization, the most significant hexidecimal digit of the fraction, that is, H2, is inspected. If this fraction digit is 0, the hexadecimal fraction digits to the right of it are left-shifted until H2 is non-zero. Further, in hexadecimal form, the characteristic represents a power of 16. Therefore, the floating point number is understood to be the product of the fraction and 16 raised to the magnitude of the characteristic. Moreover, the characteristic is expressed as a positive quantity that assumes a value between 0 and 127. This is actually a codified representation of characteristics in the range −64 to +63. Thus, the actual value of the characteristic can be obtained by subtracting 64 from the value in the characteristic field. In conventional terminology, the quantity 64 (40 in hexadecimal) is referred to as a "bias" quantity.

The results of floating point operations are of interest in establishing conditions determinative of a sequence of instructions that includes floating point instructions. In the IBM System/370 these conditions are represented by two adjacent bits of the program status word (PSW) referred to collectively as the "condition code."The condition code has at least three states, 00, 01, and 10, and is affected by the outcome of a floating point operation. When a floating point operation is completed, the code is set to 00 if the result is 0, to 01 if the result is negative ($<0$), and to 10 if the result is positive ($>0$). As is known, the condition code is set by the results of add class and compare operations and is normally utilized to determine the target instruction of a branching instruction.

The execution of a floating point operation in the IBM System/370 can also lead to the generation of an interrupt request to the operating system supervisor. As is known, the interrupt request signals the occurrence of conditions other than or in addition to those indicated by the condition code. Generally, an interrupt request results in suspension of program execution. In the context of floating point operations, an interrupt request is generated when one of a number of exceptions occurs. In this regard, the exceptions are: exponent overflow, exponent underflow, divide by zero, square root of a negative number, and significance.

The exponent overflow exception occurs when the final characteristic of a result exceeds 127 and the fraction of the result is non-zero. Normally, the exponent overflow exception results from add class operations requiring a carryout of the most significant fraction digit, which is adjusted for by right-shifting the fraction and increasing the characteristic by 1. In multiplication or division operations, exponent overflow occurs during characteristic computation.

Exponent underflow occurs when the final characteristic of the result has a value less than 0, as can occur in add class normalization or in multiply or division postnormalization. Exponent underflow also can result from characteristic calculation during multiply or divide operations. It is noted that prenormalization underflow will not generate an interrupt request.

Exceptions also result in a divide operation when the denominator is 0, or when the square root of a negative number is attempted.

Significance exceptions arise, depending upon the state of a bit in the PSW called the significance exception mask (SM). If the bit is 1 and the fraction of the result of an add class operation is 0, an interrupt request is generated. If, however, the SM value is 0, and the result fraction of an add class operation is 0, no interrupt takes place.

In the operation of computers including floating point capability such as the IBM System/370, floating point operations are serialized. This results from the requirement for precisely synchronizing program interrupts and condition code updates to the execution of an instruction stream. Such synchronization is necessary because the form and continuity of the instruction sequence is determined by the condition code and interrupt requests. In most of the architectures embodying the System/370, synchronization of the instruction stream to condition code updates and interrupt requests is accomplished by restraining the issue of an instruction until the completion of a currently-executing floating point operation, which ensures that a condition code update or interrupt request resulting from the outcome of the operation will be available to determine whether the instruction sequence should be branched or interrupted. In these systems, instruction issue takes account of the current state of the condition code and interrupt request signals only when assurance is given that a floating point operation has completed execution. Completion is most frequently indicated by a validity response signal dependent upon the completion of a floating point operation: when the signal is provided, indicating completion of the operation, the current state of the condition code and the interrupt request are considered to be valid.

The requirement to await the outcome of a floating point operation for provision of a validity response can reduce the efficiency of floating point arithmetic units employing pipelined or parallel processing techniques. In these modern arithmetic units, more than one floating point operation process can be executing simultaneously. Obviously, serialization of floating point instructions in response to floating point operation results reduces the efficiency of pipelined floating point units by permitting the initiation of a floating point instruction only upon the completion of a currently-executing instruction, thus obviating the benefits of parallelism. It should be evident that, if the validity response for a currently-executing floating point instruction could be provided prior to the completion of the instruction, two or more floating point instructions could execute simultaneously and thus permit full advantage to be taken of pipelined floating point architecture. A concomitant benefit would be to accelerate the rate at which instructions are issued, thereby increasing the overall computation speed of a machine.

THE INVENTION

Therefore, it is a principal object of this invention to provide an accelerated validity response for floating point arithmetic operations.

A further object is to increase the instruction-issuing rate of a combination including a floating point arithmetic unit which executes floating point arithmetic instructions against pairs of operands and an instruction processing entity which provides instructions to the unit in a conditioned sequence, with each instruction provided in response to a validity signal indicating the completion of a previous instruction by the floating point arithmetic unit by advancing the provision of the validity signal to a time prior to the completion of the floating point instruction with which it is associated.

A still further object is to devise a method for accelerating the validity response corresponding to the execution by a floating point arithmetic unit of a floating point operation on a pair of operands in response to each of a number of multiclass floating point arithmetic instructions issued by an instruction-issuing entity in a sequence conditioned by the execution results of the arithmetic instructions.

These objects are realized by an apparatus including a threshold circuit for numerically combining exponents in the operands of an issued floating point instruction to obtain an intermediate characteristic and for comparing an intermediate characteristic to a predetermined threshold range prior to the completion of the issued instruction. Testing logic conditioned by the characteristics and fractions of the operand pair and by the operation field of the issued instruction identifies add class instructions and determines whether the execution of the identified add class instructions will produce a zero or non-zero result. A validity trigger responds to the threshold circuit and to the testing logic by issuing an accelerated validity response prior to the completion of the issued instruction if the instruction is a multiply instruction and the intermediate characteristic is within the threshold range, or, if the instruction is an add class instruction, the intermediate characteristic is within the threshold range, and the execution of the instruction will produce a non-zero result.

The invention is also expressed in the context of the combination of a floating point arithmetic unit that executes floating point arithmetic instructions and an instruction issuing entity that issues floating point instructions in a sequence determined by a condition code and an interrupt request produced by the floating point arithmetic unit at the completion of a floating point instruction. The invention is a number of pipeline registers that sequence issued floating point arithmetic instructions in synchronism with their execution by the floating point arithmetic unit. An access circuit is also included that accesses the floating point arithmetic unit to selectively obtain portions of the operands or intermediate results of issued floating point arithmetic instructions sequenced in the pipelined registers. A response accelerator responds to the sequenced instructions in the pipeline registers and to the operand portions and intermediate results obtained for an instruction in the registers by providing a validity response prior to the completion of the instruction by the floating point arithmetic unit, the validity response assuring that the condition code and interrupt request indicate the correct outcome of the issued instruction.

The embodiment of the invention, when expressed as a method, includes the steps of, upon the receipt of an issued floating point arithmetic instruction by a floating point arithmetic unit, combining the unnormalized exponents in the operands of the issued instruction to obtain an intermediate characteristic approximating the characteristic of the result of the issued instruction. Next follows testing the intermediate characteristic against a first exponent threshold range and then, if the intermediate characteristic is contained within the first exponent threshold range, providing the validity response at a source time prior to completing the execution of the issued arithmetic instruction. The method includes the further steps of performing the combining and testing steps only if the issued arithmetic instruction is a multiply instruction or an effective add instruction which will produce a non-zero result. Otherwise, the intermediate characteristic is obtained from the floating point arithmetic unit, tested against a second exponent threshold range, and, if the intermediate characteristic is contained within the second exponent threshold range, the validity response is provided at target time subsequent to the source time but prior to completing the execution of the issued arithmetic instruction.

In considering the expression of the invention as an apparatus or method, the skilled artisan would fail to anticipate that the outcomes of certain issued floating point arithmetic instructions can be predicted before completion of the associated floating point operations. However, the inventor has advanced the art beyond this point by observing first that, because exceptions to floating point multiply instructions are based solely on exponent overflow or underflow, these exceptions can be predicted by combination of operand exponents and analysis of the combination prior to the execution of the instructions. The significance of this observation is dramatized in the case of pipelined floating point architecture which provides an opportunity to analyze the exponents of multiplication operands while their associated instructions are being sequenced through the floating point pipeline. The inventor has next observed that the same analysis can be made of the operand exponents for add class floating point instructions in the floating point pipeline and, further, that a zero or non-zero result for such instructions is predictable based upon examination and analysis of their operand signs and fraction. This permits the opportunity to predict the occurrence or non-occurrence of significance exceptions and interrupts for zero-producing results as well as the opportunity to provide an early validity response and predict the condition code for instructions that will produce non-zero results.

BRIEF DESCRIPTION OF THE DRAWINGS

FIG. 9 is a block diagram of a validity response trigger logic circuit.

DETAILED DESCRIPTION OF THE PREFERRED EMBODIMENT

Figures 1, 2, 3:
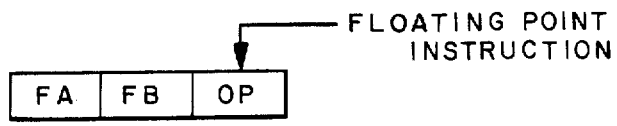
FIG. 1 is the binary representation of a floating point instruction operand.
FIG. 2 is the hexadecimal representation of the FIG. 1 operand.
FIG. 3 illustrates the basic format of a floating point instruction.
Figure 4:
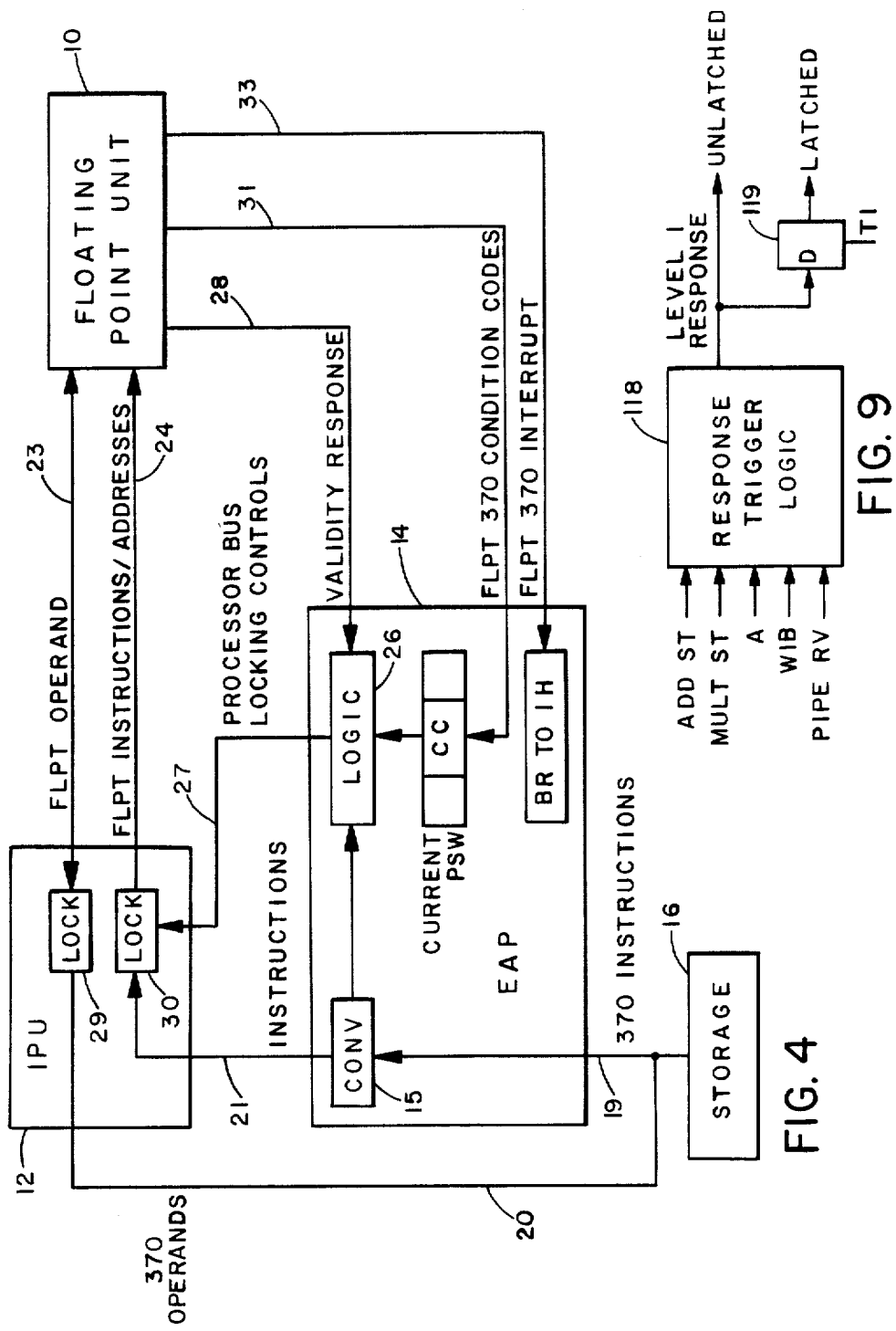
FIG. 4 depicts a floating point arithmetic unit in an operational relationship with an instruction entity that issues instructions in a conditioned, interruptable sequence.

The industrial context of the invention is illustrated in FIG. 4 where a floating point arithmetic unit (FPU) 10 receives a sequence of floating point (FLPT) operands and instructions from an instruction issuing entity including an instruction processing unit (IPU) 12, an emulation assist processor (EAP) 14, and a storage unit 16. It should be noted that FIG. 4 refers to an explicit context within which the inventor has applied the invention. Thus, to practice the invention, it is not necessary that the instruction processing entity have the structure of FIG. 4. It can consist, for example, of a conventional computer complex operated by an IBM System/370. However, in the case of FIG. 4, the EAP 14 is utilized to map IBM System/370 instructions into a target instruction stream that flows through the IPU 12 to the floating point unit 10. An emulation assist processor such as the EAP 14 is described in detail in U.S. Pat. No. 4,587,612 of Fisk et al., and assigned to the assignee of this application. The U.S. Pat. No. 4,587,612 is incorporated herein by reference.

In FIG. 4, the storage facility 16 contains a program consisting of instructions in System/370 format and their associated operands. Typically, the storage 16 is organized to permit memory access by address signals that are provided by the EAP 14 on a signal path (not shown). In response to these address signals, instructions and operands are provided on signal lines 19 and 20. The System/370-formatted instructions are received by the EAP 14 and translated by conventional conversion means (CONV) 15 into instructions that are intelligible to the floating point unit 10. The translated instructions are provided on signal line 21 to the IPU 12. The operands and associated instructions received by the IPU 12 are passed on databuses 23 and 24 as floating point (FLPT) operands and instructions, respectively. The buses 23 and 24 are fed by the operands and instructions provided to the IPU 12 on signal lines 20 and 21. The buses 23 and 24 can be locked to prevent the provision of a new instruction by processor bus locking controls developed by locking logic 26 in the EAP 14. Locking control signals are provided on signal line 27 to bus locking mechanisms (LOCK) 29 and 30, which can comprise, for example, registers or latches.

In the discussion which follows, an issued instruction is considered to be one which is registered or latched in the locking mechanism 30. For certain types of instructions, one of the instruction operands can also be held in the mechanism 29. The locking controls are implemented to issue an instruction by replacing the currently-held instruction in the mechanism 30 with a succeeding instruction available on signal line 21. In this regard, the logic 26 determines whether or not an instruction is to be issued by generating or withholding a locking control signal on the signal line 27.

If the instruction issuing functions of the architecture of FIG. 4 are considered in the context of System/370, the EAP 14, through the logic 26, will withhold the issue of an instruction until receipt of a validity response on the signal line 28 from the floating point unit 10. When the validity response is received at the completion of the floating point instruction currently held in the locking mechanism 30, the EAP 14 will inspect the condition code and the interrupt signal lines 31 and 33 to determine the current state of the condition code and whether an interrupt request has been generated as a result of the completion of the instruction in the locking mechanism 30. Although not necessary for an understanding of the present invention, it will be appreciated that the condition code signal on the line 31 will be used to determine whether the condition code in the current PSW will change. Receipt of an interrupt request on the signal line 32 will cause the routine in the EAP 14 to branch to an interrupt handler (BR to IH), which would conventionally consist of a software routine.

Therefore, within the System/370 context, if the EAP 14 senses that the currently-offered 370 instruction to be executed is of the type that can possibly cause an interrupt, or one in which the condition code for the operation must update the current PSW, it will provide the appropriate locking control signal to lock up the buses 23 and 24, which will prevent the IPU 12 from providing any more instructions to the floating point unit (FPU) 10 or to any other units attached to the buses 23 and 24. The lock will be maintained until receipt of the validity response, when the condition code and interrupt lines are checked.

In the traditional System/370 context, the rate of instruction delivery to the FPU 10 is governed by the following factors:

1. The speed at which the FPU 10 can complete the operation required by the instruction currently in the locking mechanism 30;

2. The speed with which the FPU 10 can notify the EAP 14 that a change in the condition code or an interruption has or has not occurred; and 3. The speed with which the EAP 14 can unlock the mechanism 30 and deliver the next instruction.

The invention improves the second rate factor by predetermining, before operation completion, whether or not certain floating point operations will result in a change to the condition code and/or an interrupt request. This predetermination permits an acceleration in the provision of the validity response on signal line 28 to a point in time before completion of the operation in the mechanism 30. Acceleration of the validity response permits the EAP 14 to test the condition code and interrupt request lines and to begin step 3 of the instruction rate sequence earlier than otherwise. This permits the next instruction to be issued before the FPU has completed the preceding one. The gain resulting from improving step 2 is further enhanced by providing the FPU 10 with a pipeline capability permitting it to execute at least two instructions concurrently.

Pipelined, multiprocessing floating point arithmetic units are known in the art. For example, the IBM System/360/91 included a floating point arithmetic unit having the capability of performing concurrent floating point add, multiply, and divide operations.

Figure 5:
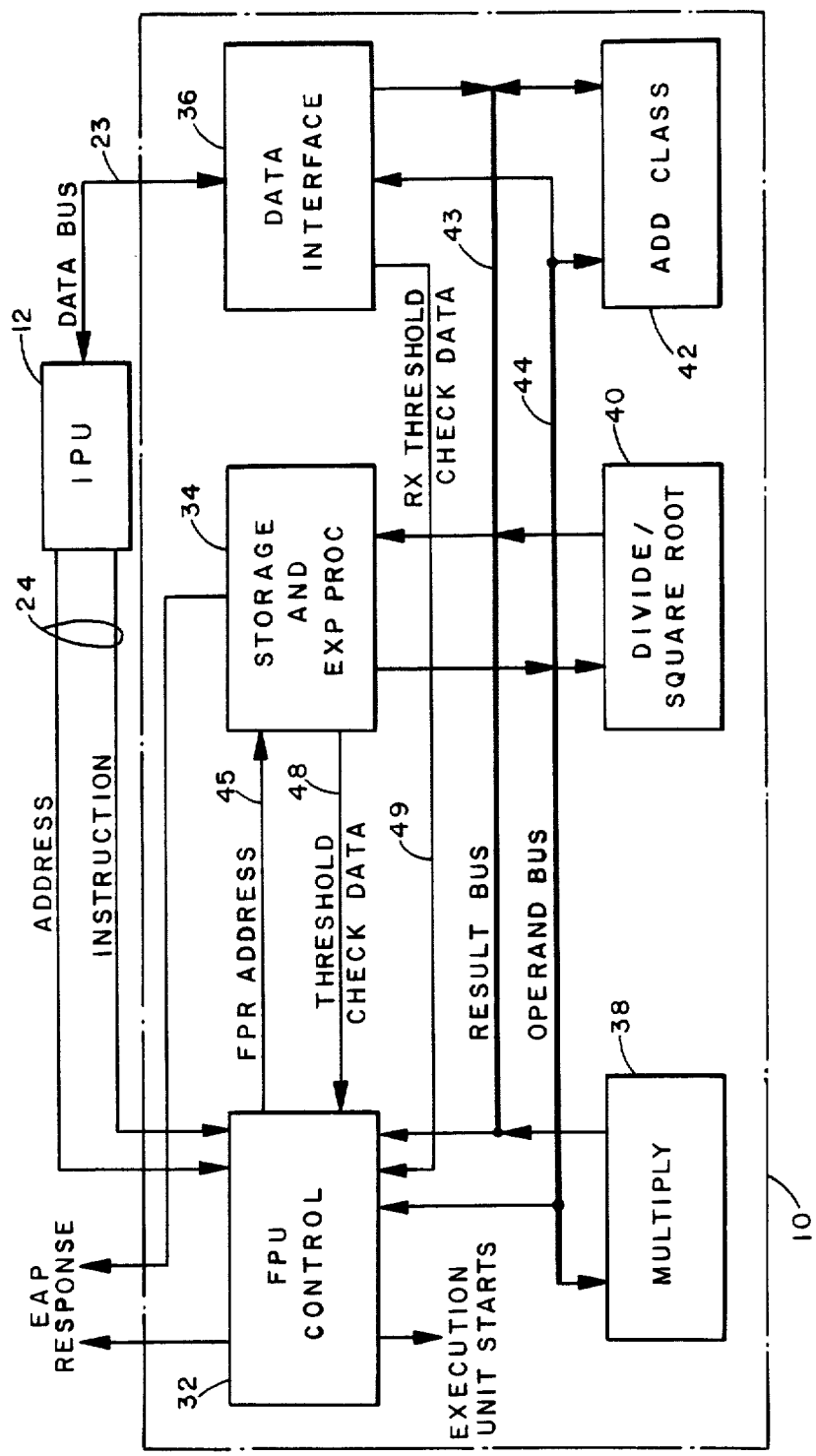
FIG. 5 is a more detailed block diagram of the floating point arithmetic unit of FIG. 4.

FIG. 5 illustrates in greater detail the structure of the FPU 10 and identifies a control function that embodies the invention. The FPU 10 includes a FPU control unit 32, storage and exponent processing section 34, a data interface 36, and execution units 38, 40, and 42 for performing floating point fraction manipulations including multiplication, division and square root, and add class operations, respectively. The control unit 32 receives floating point instructions and operand addresses on the bus 24 and includes logic for orchestrating and synchronizing all functional unit operations. The storage and exponent processing unit 34 includes floating point registers (FPR) for storing the operand pairs which are subjected to floating point operations. The unit 34 also includes conventional circuitry for performing exponent arithmetic, prenormalization, and postnormalization. The data interface 36 stages operands between the FPU 10 and the IPU 12 over the bus 23. Operands received over the bus 23 are staged by the data interface 36 to the storage and processing unit 34 over a result bus 43, which is internal to the FPU 10. Operands provided to the unit 34 are stored in the FPRs at locations indicated by an FPR address provided on signal line 45 by the control unit 32. Operands are provided to the execution units 38, 40, and 42 over an operand bus 44, also internal to the FPU 10. Simultaneously with delivery of a set of operands to an execution unit, an execution unit start signal is provided by the control block 32 to the appropriate execution unit. With delivery of an operand pair and an execution unit start signal, the designated execution unit performs the manipulation on the fractions of the operand pair required by an issued instruction. The results of the fraction manipulation are passed on the result bus 43 back to the FPRs in the block 34 for storage. Result operands are transferred from the FPR to the data interface block 36 on the operand bus 44; from the data interface block 36 the result operands are transferred back to the IPU 12 on the bus 23.

The accelerated validity response is generated according to the invention in the control unit 32 using threshold check data obtained from the FPRs on signal line 48 and from the data interface block 36 on signal line 49. In the description following, the term "threshold check data" refers to information derived directly or indirectly from the signs, characteristics, and fractions of the operand pair used by an instruction issued to the FPU 10 on the instruction bus 24. The threshold check data signal path 49 is required for the well-known RX-type of floating point arithmetic instruction in which the second operand is obtained from storage. Therefore, in the case of RX-type floating point instructions, threshold check data derived out of the operand extracted from storage is provided to the control block 32 on the signal line 49, while the threshold check data for the other operand in an FPR is provided on signal line 48. In all other cases, the threshold check data for both operands is provided on signal line 48.

In operating according to the invention, the control unit 32 combines the exponents of the two operands to be used in the floating point operation required to execute the instruction issued to the FPU 10. By taking into account prenormalization of the operands with their resulting exponent adjustments, and postnormalization of the result with its final exponent adjustment, the exact amount of exponent underflow or overflow can be determined. However, in many cases, this exact information is unnecessary in developing a validity response for the EAP 14, since an exception of this kind is rare in normal instruction mixes. The inventor has observed that, if it would be possible to guarantee the non-occurrence of an interrupt prior to the completion of an FPU operation, the FPU 10 could provide a validity response while the operation was still executing. The inventor has further observed that such a guarantee is possible based on the knowledge that an intermediate characteristic derived from the exponents of the operands engaged in the operation can fall into a predetermined allowable exponent threshold range where even the maximum possible number of prenormalization or postnormalization shifts could not cause the operation to result in an exponent underflow or overflow. Thus, under conditions described later in more detail, a determination that an intermediate characteristic is contained in the predetermined exponent threshold range is used by the control block 32 of the FPU 10 to generate an accelerated validity response.

It is conceded that the limits selected for the exponent threshold range may result in the failure to accelerate a validity response for operations whose results will not cause an exception (after completion of the operation). Therefore, the inventor provides several chances to accelerate the validity response before completion of an operation.

In this regard, the term intermediate characteristic refers to the algebraic combination of the exponents of the floating point operands subjected to the last-issued floating point instruction. The combination can be by addition, subtraction or comparison. Therefore, the "threshold check data" delivered by the FPU blocks 34 and 36 to the control block 32 in FIG. 5 includes operand exponents.

The threshold check by which intermediate characteristics are compared against the exponent threshold range evaluates intermediate characteristics for possible result exponent overflow and underflow, disregarding any actual amount by which the exponents of individual operands are adjusted by prenormalization or postnormalization processes. The exponent threshold range check further assumes that each operand will undergo the maximum possible prenormalization or postnormalization, with the result that the intermediate characteristic will be moved in the direction of one of the range limits.

For example, in the case of testing for a possible underflow during a long multiply operation, it is assumed that each operand involved in the operation will undergo the maximum possible prenormalization of 13 hexadecimal digits, and that the result will undergo the maximum possible postnormalization of one hexadecimal digit. This yields a total of a possible 27-digit intermediate exponent reduction. A convenient lower bound for the exponent threshold range would be 32. If the intermediate characteristic is below this point (that is, out of the range), early response is postponed. In the preferred embodiment, the upper range limit is set at 127, thereby providing an exponent threshold range of [32,127] for long multiply operations. For short multiplication operations, the range is [16,127].

It will be appreciated by those skilled in the art that the exponent threshold ranges for long and short multiplication will eliminate many multiplication operations that will not result in exponent overflow or underflow. For these cases, a second exponent range is employed, this time using as the intermediate characteristic the exponent produced by prenormalization adjustments made by the storage and exponent processing unit 34. The second exponent threshold range in this case is [16,1279 . Now the lower limit of the threshold range is one digit above underflow, allowing for a single digit of postnormalization processing. For multiply, divide, and square root operations not falling in the second exponent threshold range, the FPU 10 is constrained to provide the validity response at the conventional time, that is, when the operation has finished executing and is complete.

In the preferred embodiment, short and long "add" class operations including normalized and unnormalized addition or subtraction also are analyzed for the purpose of an accelerated validity response. In this regard, the inventor has observed that, although the characteristics of add class instruction operands can be analyzed for inclusion in the first and second exponent threshold ranges defined above, these operations also admit of the chance for a significance exception to occur when they produce zero result fractions. This possibility exists for all operations termed "effective subtracts." When used herein, the term "effective subtract" denotes a floating point operation in which the operand FB is effectively subtracted from the operand FA. Effective subtracts are defined as add class operations having an odd number of minus signs, taking into account the signs of the operands and the sign of the operation. Thus, for example, the addition of a positive and a negative operand is an effective subtract since the operand with the negative sign is effectively subtracted from the operand with a positive sign. The subtraction of a negative operand from a negative operand is also an effective subtract.

The possibility of a zero result also exists for add class operations termed "effective adds." An effective add operation is defined as one having an even number of negative signs, taking into account the signs of the fractions of the operation. Thus, for example, an effective add operation is one in which a negative operand is subtracted from a positive operand. Similarly, an effective add is the sum of two negative operands. A zero results is possible in an effective add operation only when both of the operand fractions are all zero.

The detection of an add class significance exception in the prior art occurs at the end of an operation when the result fraction is inspected and analyzed in view of the SM in the PSW as described above.

Therefore, provision of an accelerated validity response requires, in the case of add class instructions, an early analysis of the outcome of the operation. Effectively, this analysis must predict whether the result will be zero or non-zero and, if non-zero, the sign of the result must be anticipated. This is necessary to ensure, when the validity response is accelerated, that an interrupt will be discovered and provided for. It is also necessary to accurately set the condition code.

Figure 6:
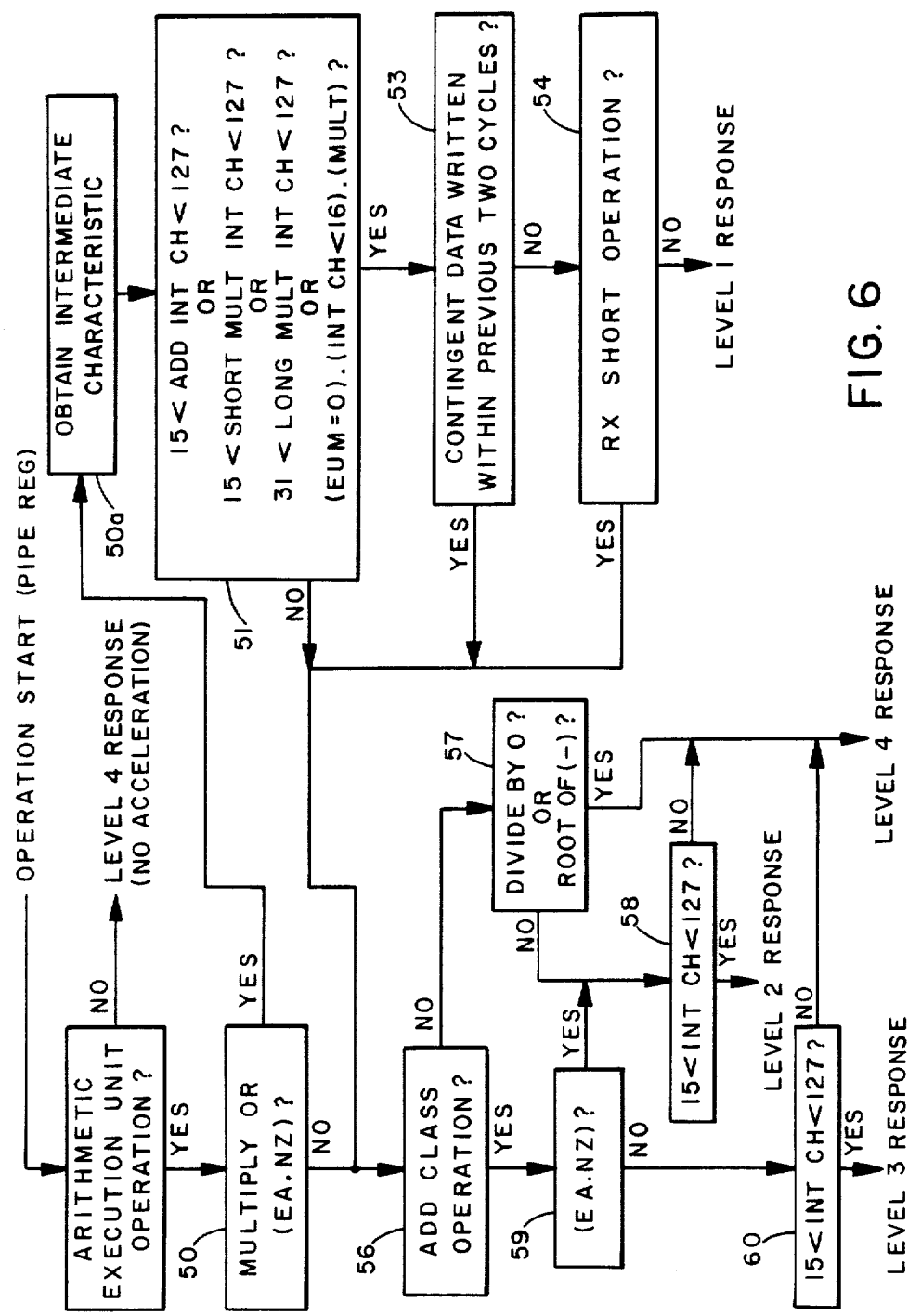
FIG. 6 is a flow diagram representing the preferred operational sequence employed to generate an accelerated validity response/according to the invention.

The procedure of the invention can be understood with reference to FIG. 6, which is a flow diagram illustrating the operational steps of the procedure. Initially, a floating point instruction for which an accelerated validity response may or may not be provided is offered to the FPU 10. As was discussed above, the FPU 10 is a pipelined unit. Therefore, the arithmetic operations performed by the FPU consist of a series of operational steps which, as will be discussed in further detail below, are synchronized to an FPU unit clock. Each arithmetic operation endures for a number of FPU unit clock cycles. In the invention, the validity response is accelerated with reference to the number of FPU clock cycles required for a particular operation. Responses are accelerated to one of a plurality of response levels, with level 1 being the most advanced, and level 4 corresponding to the conventional response time, that is, the end of an operation.

In FIG. 6, the method of the invention begins with the provision of a floating point instruction to the FPU 10, which initiates an instruction operation sequence in the FPU. If the instruction is one not requiring use of one of the execution units 38, 40, or 42, the procedure is exited and the validity response is not accelerated according to the invention. If, on the other hand, the instruction requires use of an execution unit, the operation is analyzed to determine whether it is a multiply operation, or an effective add operation which will produce a non-zero result operand. In either of these cases, the positive exit is taken from step 50.

Upon the positive exit from step 50, an intermediate characteristic (INT CH) based upon the characteristics of the two operands is generated and compared to a first exponent threshold range whose extent depends upon the operation involved. In the case of an effective add operation with a predicted non-zero result, the intermediate characteristic is the larger characteristic of the two operands involved in the operation. This characteristic is evaluated with respect to the range [16,126]. The lower end of the range, 16, which is chosen for design convenience, assumes that there will be a maximum number of left-shifts of the result during postnormalization. Since, with long addition, the maximum shift is 13 hexadecimal digits, it will be evident that the lower limit of the range provides a margin of three extra adjustment digits for the exponent of the result. The upper end of the range, 126, covers the possibility of a carry-out, requiring a left-shift of the fraction by one hexadecimal digit, accompanied by an increase in the result exponent of one.

The intermediate characteristic for multiply class operations is obtained by adding the characteristics of the two operands, adjusting the sum to account for the extra bias of 64, and comparing the adjusted intermediate characteristic value to a first exponent threshold range. In the case of the short multiply operation, the range is [16,127]; for long multiply, the range is [32,127]. Finally, special provision is made in block 51 for the case where a PSW bit called the exponent underflow mask (EUM) is reset and the operation is a multiply. In this case, if the intermediate characteristic is 15 or less, the intermediate characteristic is considered to be in the first exponent threshold range.

When the intermediate characteristic tested in block 51 is contained in the indicated first exponent threshold range, the positive exit is taken from the block. In the preferred embodiment, two further tests follow the positive exit from block 51. These tests, blocks 53 and 54, are necessitated by the specific structure and operation of the FPU 10. These steps can be omitted in other, differently-integrated FPUs, without affecting the primary objects or basis of the invention. In step 53, a test of the staleness of the exponent operand data used to calculate the intermediate characteristic of block 51 is made. The check ensures that the exponent data is fresh and results from a completed floating point operation. If not fresh, the procedure assumes that the exponent data will be supplied by the result of an ongoing FPU operation.

In step 54, a short RX-type floating point arithmetic operation is tested for. Such an operation is initiated by staging data through the data interface 36 of the FPU (FIG. 5). In these operations, the entire operand is staged into the data interface 36 concurrently with the initiation of the operation. The operand is transferred to the indicated execution unit without being staged through the FPR in the block 34. An extra FPU clock cycle is required for the control block 32 to obtain the threshold check data on the signal line 49. Therefore, the exponent data for a short RX-type floating point operation is available .o the control block 32 one cycle after the beginning of the operation. Since the threshold check data for the FA operand is not completely available at the beginning of the operation, the acceleration of a validity response must be delayed by one FPU cycle. Contrastingly, for RX-long type operations, the operand data is staged to the data interface 36 during two successive FPU cycles, with the exponent data being transferred during the first of the two cycles. The corresponding RX-long type operation does not begin until the second of the two transfer cycles, resulting in the threshold check data on line 49 being available concurrently with the threshold check data on line 48 one cycle prior to the beginning of the floating point operation.

Assuming that the exponent data is fresh and that the operation is not an RX-short type, a positive exit from the block 51 will result in the provision of an accelerated validity response at the earliest possible time. This time is termed level 1.

Assuming the failure of the arithmetic operation to pass the test block 50, a negative exit from block 51, or a positive exit from block 53 or 54, the intermediate characteristic described above is obtained from the storage and exponent processing unit 34 of the FPU and tested against a second exponent threshold range [16,126]. The second exponent threshold range pertains to every operation entering the block 56 except divide operations involving a zero-magnitude divisor and root operation involving a negative number. If the intermediate characteristic is not within the second exponent threshold range, or if the operation is a zero-divide or negative root one, a level 4 validity response is provided when the operation is complete.

In FIG. 6, if the issued instruction fails any of the tests for a level 1 response, the procedure enters block 56, where the instruction is once again tested to determine whether it involves an add class operation. If it is not an add class operation, the procedure enters block 57 to determine whether it is a division operation with a zero operand or a negative root operation. If the instruction involves neither of these operations, the negative exit is taken to block 58.

Block 58 is also entered by taking the positive exit from block 56, which indicates that the instruction is an add class operation. Add class operations are again tested to determine whether they are effective adds producing non-zero results resulting in the positive exit being taken from block 59 to the intermediate characteristic test of block 58.

In block 58, the intermediate characteristic of the involved operation is tested against the range [16, 126]. If within the range, the operation causes a level 2 validity response to be generated, which occurs after a level 1 response, but before a level 4 response.

The negative exit from the block 59 indicates that the operation is either an effective add involving a zero operand or an effective subtract operation. In this case, if the intermediate characteristic of the involved operands is within the exponent threshold range of block 58, the positive exit is taken from block 60 and the validity response is accelerated to level 3. A level 3 validity response occurs before the completion of the operation, but after the time available for a level 2 response.

If the positive exit is taken from the block 57 or a negative exit from the block 58 or 60, the operation is permitted to execute to completion, after which a level 4 response will be provided at the conventional time following completion of the operation.

Figure 7A:
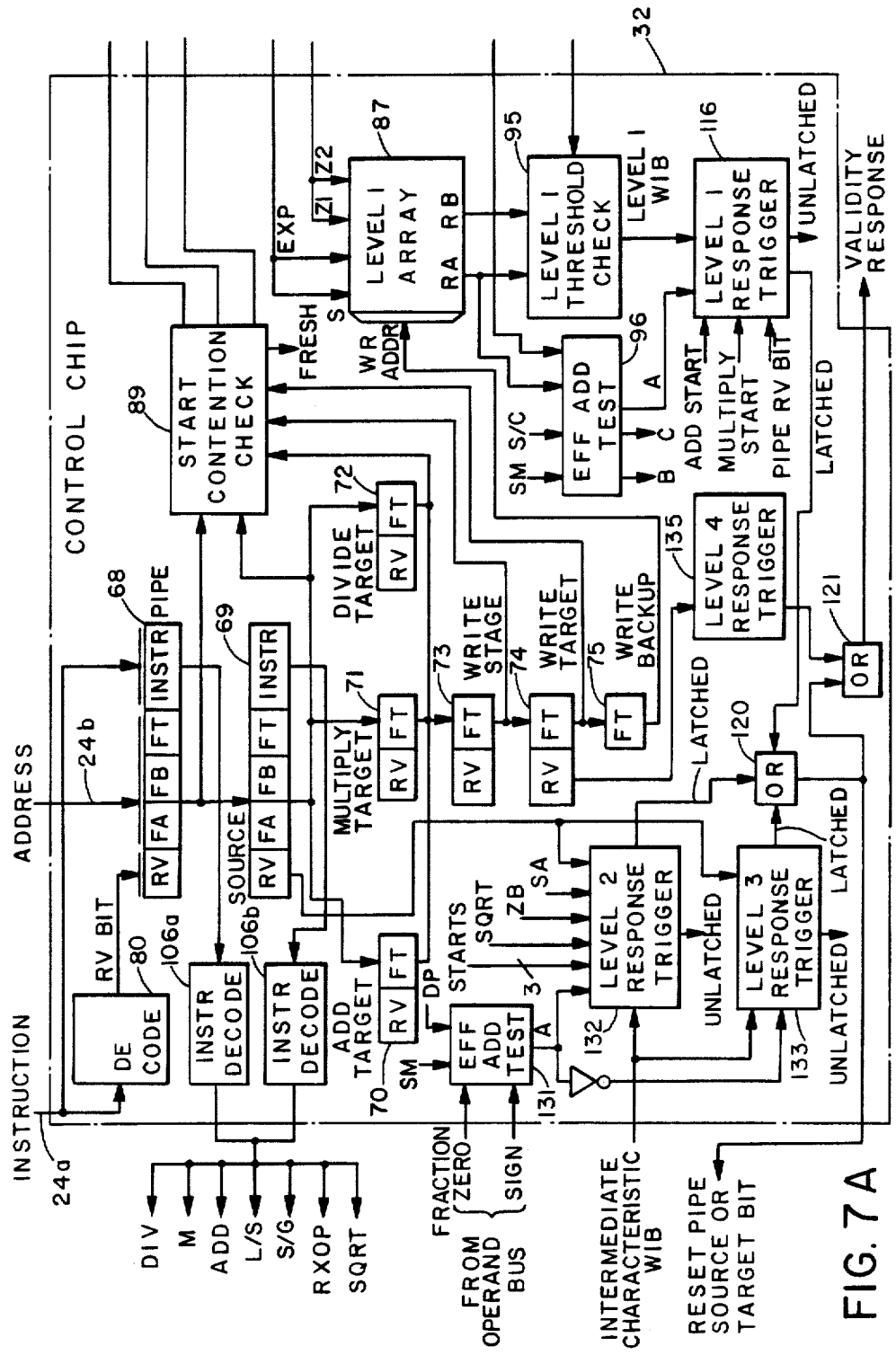
FIGS. 7A and 7B combine into a block diagram illustrating a pipelined control structure useful for implementing the operational sequence of FIG. 6.
Figure 7B:
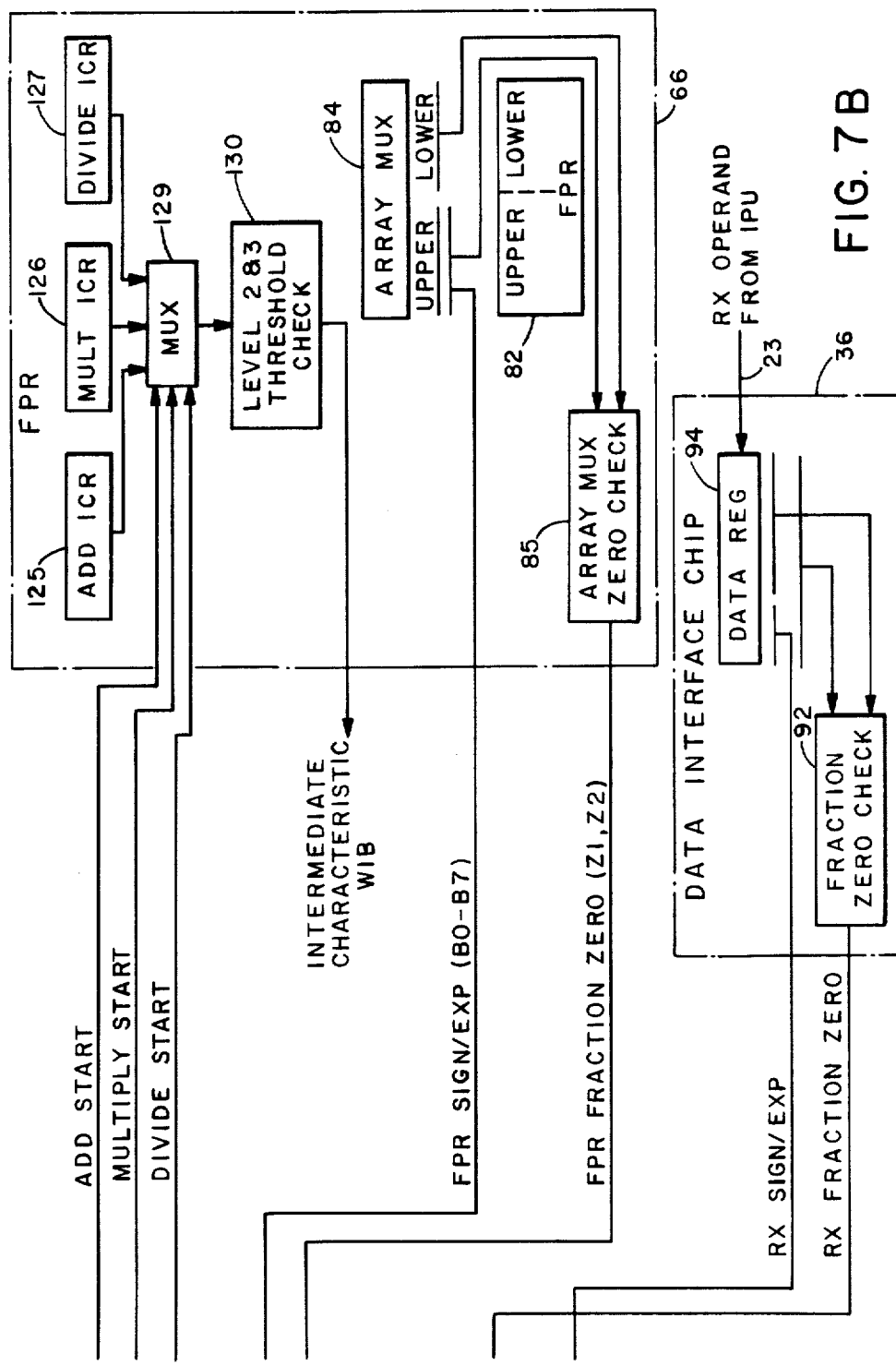

Reference now to FIGS. 7A, 7B, 11A and 11B will provide an understanding of the generation and timing of an accelerated validity response with respect to the execution of a floating point operation. In FIGS. 7A and 7B, the control unit and data interface are again indicated by reference numerals 32 and 36, while the remainder of the FPU is consolidated into the block indicated by reference numeral 66. In the following portion of the description, the block 66 will be referred to as the consolidated storage and execution unit (CSEU).

In FIG. 7A, the control unit 32 includes a number of pipelined registers 68–75, which are arranged in a sequential parallel structure through which instruction data is shifted in synchronism with floating point instruction operations conducted by the CSEU 66. The pipelined registers define a multi-level sequence to which the previously-described level responses correspond. In this regard, when an instruction is issued, information relative to that instruction is initially stored in register 68, termed the "pipe" register during a first FPU cycle. Next, the information is shifted in parallel from the "pipe" register 68 to a "source" register 69. Following storage in the source register 69, instruction data is shifted to one of three registers 70, 71, or 72, termed, respectively, the "add target," "multiply target," and "divide target" registers. The data is shifted into the target register corresponding to the operation required to execute the issued instruction. Thus, for a multiply instruction, instruction data will be transferred from the source register 69 to the multiply target register 71. Following the target registers is a sequence of three registers 73, 74, and 75 labelled, respectively, the "write stage," "write target," and "write backup" registers. Data is sequenced through these three registers during three successive FPU cycles.

Figure 11A:
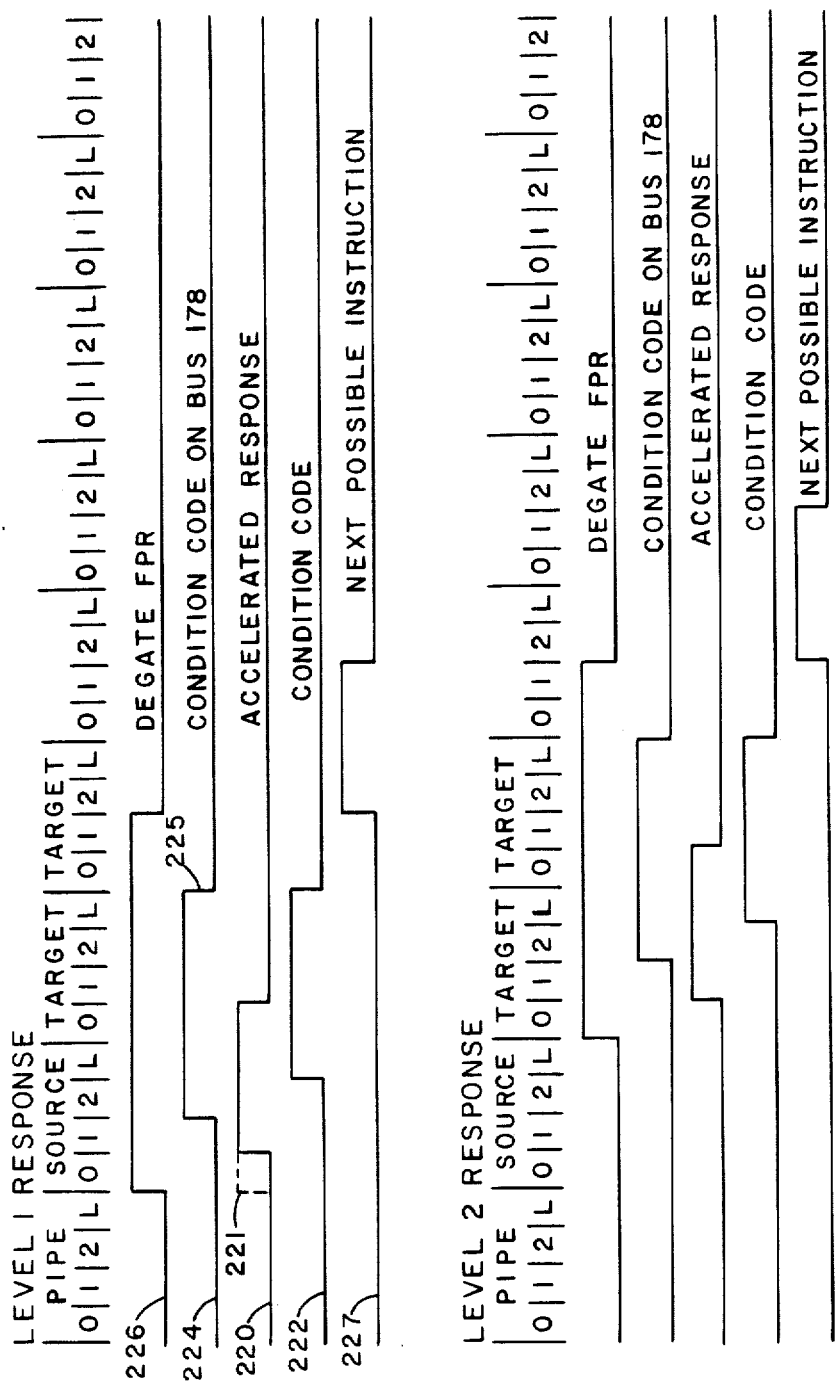
FIGS. 11A and 11B are timing diagrams illustrating how the operations of the FIGS. 7A, 7B, and 9 block circuits are synchronized with respect to the accelerated validity response.
Figure 11B:
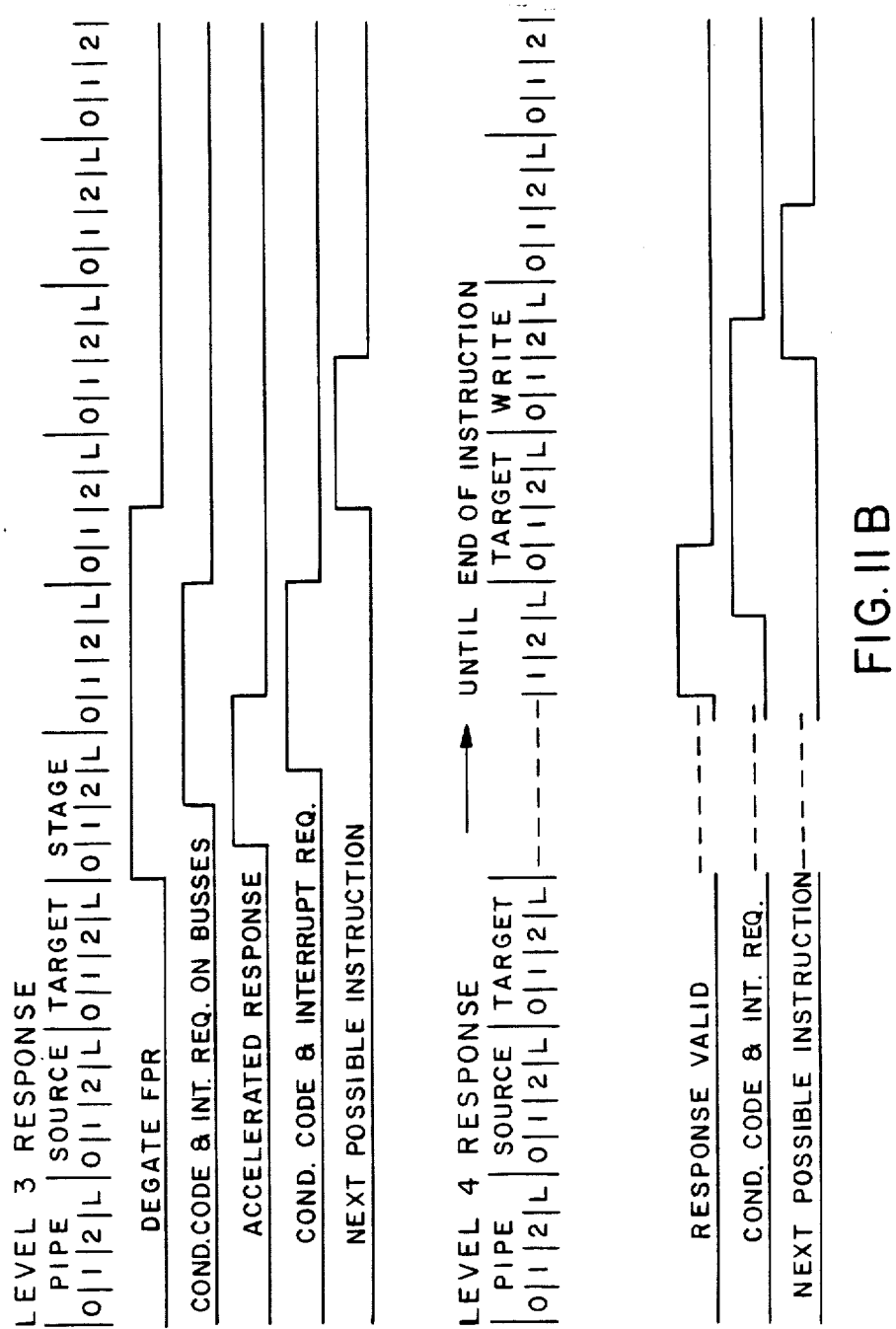

As shown in the four sets of waveforms in FIG. 11A and 11B, information is shuttled through the pipeline registers during a succession of FPU cycles. In the context of the specific embodiment, each FPU cycle is subdivided into four subcycles labelled 0, 1, 2, and L, respectively. During the first (PIPE) cycle of an instruction pipeline sequence, instruction information is held in the pipe register 68. At the end of the L subcycle (time T1) of the PIPE cycle, the instruction information is transferred to the source register 69, where it is held for the duration of the SOURCE cycle. During the L subcycle of the source cycle, the information is transferred to an appropriate one of the target registers 70, 71, or 72. Instruction information remains in the target registers 70, 71, and 72 until the end of the associated operation, which can consume a number of FPU cycles, each labelled a TARGET cycle. At the end of the operation, instruction information is shifted from the corresponding target register to the write stage register 73, where it is held for a single STAGE cycle.

In the specific context of the preferred embodiment, a level accelerated validity response for a qualified operation is provided during the SOURCE cycle of the associated instruction. A level 2 response for an instruction is provided during the first TARGET cycle if no prenormalization is required. If prenormalization cycles are required, the level 2 response is provided on successive TARGET cycles. Instructions which do not qualify for the first or second validity response levels can stimulate a level 3 response during the STAGE cycle of the instruction. A level 4 response corresponds to the default validity response condition, and is given if the instruction arrives in the WRITE TARGET register 74 without having generated an accelerated validity response at level 1, 2, or 3.

Turning to the block diagram of FIGS. 7A and 7B, an issued instruction is provided to the control block 32 over the instruction bus. In FIG. 7A, the instruction bus comprises an instruction code bus 24a and an operand address bus 24b. A code corresponding to the issued instruction is placed on the operand bus 24a and is fed to the instruction operand (INSTR) field of the pipe register 68. Address information corresponding to specific floating point registers (FPRs) in the CSEU 66 are provided on the address bus 24b. If the instruction is non-RX, the FPR addresses are the address of the FPR holding the first operand, which is entered into the FA field of the pipe register, the FPR holding the second operand, which is entered into the FB field of the pipe register, and the FPR to which the instruction result is to be stored, which is placed in the FT field of the pipe register If the instruction is an RX-type, only the FA and FT addresses are provided to the pipe register 68.

Both the pipe and source registers 68 and 69 store the FA, FB, FT and INSTR fields of the instruction as well as a response valid (RV) bit. The RV bit is provided by a decoder 80 in response to the INSTR code of the instruction if the instruction is an arithmetic one, requiring use of one of the execution modules 38, 40, or 42. The information including the RV bit, the FPR addresses, and the INSTR code is transferred from the pipe to the source register; however, only the result address FT and the RV bit are transferred from the source to one of the target registers 70, 71, or 72. Therefore, the target registers represent the FPR register to which the result of a floating point operation is to be written. When the execution unit phase of an operation is completed, the RV and FT fields are transferred sequentially through the write stage, write target, and write backup registers. At this point, the operation is not complete and may yet require post normalization.

Entry of operands into the FPRs 82 is done conventionally through an FPR array multiplexer 84. As is known, the FPRs include eight 64-bit registers, each split into an upper and lower 32-bit section for storing short and long operands. At the time an operand entry is made into a floating point register, the sign and characteristic of the operand are provided to the control unit 32. In addition, a zero checking circuit 85 outputs a pair of FPR fraction zero bits, Z1 and Z2, the first for bits B8–B31 of the fraction, and the second for bits B32–B63 of the fraction. If the value of the fraction portion is zero, its corresponding zero bit is set, otherwise the zero bit is reset. The FPR address of the operand currently being written to the FPRs 82 is the FT address in the write target register 74. The write backup register address is provided to a level 1 sign/zero/exponent array 87 in the control unit 32 on the cycle after the FPR is written. The array 87 is an addressable register array that contains the threshold check data for an operand at a register address corresponding to the operand's FPR register address.

When an instruction is issued, it is provided to the FPU 10, causing the entry of data initially into the pipe register 68. The pipe register 68 is where all operations begin by signalling the appropriate FPU execution unit that it is about to receive a pair of operands. The FPR address and INSTR field contents in the pipe register 68 are provided to conventional contention logic 89, which serializes the access to FPU resources such as the FPRs, the internal FPU buses, and the execution units. When FPU resources are available to execute the operation indicated by the INSTR field of the instruction in the pipe register, the appropriate process START signal is sent to the execution unit, and the pipe register information is transferred to the source register 69. The source register 69 retains the instruction information for one cycle only and is used primarily to indicate which execution unit has use of the operand bus. The four subcycles of the SOURCE cycle are sufficient to transfer the FA and FB FPU register contents to the appropriate execution unit and initiate the operation of the execution unit assuming no prenormalization is required. Next, the result address in the FT field is passed to the appropriate execution TARGET register. The TARGET register holds the address until it receives a signal from the execution unit that the result is complete. The result address is then passed to the WRITE registers, where it is used to control the storing of the result in the FPRs.

Although not specifically shown, it will be appreciated that conventional circuitry is available to generate the subcycle FPU clocks of the type described above. Further, it should be evident that transfer of information through the pipeline registers can be accomplished by gating appropriate subcycles of the FPU clock to the registers, with the gating of a subcycle to any of the registers dependent upon the conditions obtaining for the corresponding stage of the pipeline.

The RV bit accompanies instruction information through the pipeline registers in order to indicate, at each potential accelerated validity response level, whether the validity response has been provided at an earlier level. Once the validity response is provided, the RV bit is reset, which blocks later responses from being generated for the same instruction. Thus, instructions that must provide a validity response to the EAP have their RV bit turned on in the pipe register 68 by the decoder 80. When an accelerated validity response is generated, the RV bit is reset, no matter where the instruction is located in the pipeline registers. If the instruction reaches the WRITE target register 74 and the RV bit is not reset, the level 4 response is given. Since the IPU 12 cannot issue another instruction until enabled by the EAP 14, it is guaranteed that, if two instructions are in the pipeline registers, they will not be able to generate concurrent validity responses. As will be evident to those skilled in the art, this reduces the total lock-out controls needed for each level of response.

LEVEL ONE VALIDITY RESPONSE GENERATION

Refer now to FIGS. 7A, 7B, and 11A for an understanding of how a level 1 validity response is generated according to the invention. Consider first in FIG. 11A the group of waveforms labelled LEVEL 1 RESPONSE. In generating a level 1 response, the level 1 response waveform labelled "ACCELERATED RESPONSE" is generated by the control unit 32 concurrently with T1 of the SOURCE cycle of the instruction. In the preferred embodiment, the operations of the EAP 14 result in the generation of the next possible instruction following the issued instruction during T2 of the second cycle following generation of the accelerated validity response by the control unit 32. Therefore, in reaction to a level 1 response, the instruction issuing unit comprising the IPU 12 and EAP 14 can issue the next instruction starting at time T2 of the second TARGET cycle in the level 1 response sequence.

In FIGS. 7A and 7B, the process of accelerated validity response is initiated by the arrival of a floating point arithmetic instruction at the FPU 10. The instruction is decoded in the decoder 80 to determine if it is the type that must update the condition code or cause an interrupt; if so, a single RV bit is generated and latched into the RV field of the pipe register 68, along with the operand addresses (FA and FB), the result address (FA or FT), and the instruction code (INSTR). It should be appreciated that, in the case of an RX-type instruction, the FA field is both a source and a target register and the FB field is not filled.

While the instruction in the pipe register 68 is waiting for the contention logic 89 to determine if the resources necessary to execute the instruction are available, the level 1 sign/zero/exponent array 87 is accessed by the two source addresses in the pipe register, FA and FB. This occurs during T1 and T2 of the PIPE cycle of the instruction.

Data in the FA and FB locations of the array 87 has been placed there as explained above by results of previous instructions, whose threshold check data was transferred over from the CSEU 66 as it was being written into the FPRs. If the instruction in the pipe register is an RX-type, the FB operand is obtained from the operand bus 23 via a data register 94 in the data interface 36. A zero check circuit 92 in the interface 36 provides the fraction zero information for the second operand in the form of fraction zero bits Z1 and Z2.

Further, the instruction code in the INSTR field of the register 68 is provided to an instruction decoder 106a, which decodes the instruction to provide control information denoted as DIV, M, ADD, L/S, S/C, RX OP, and SQRT. In this respect, DIV, M, and ADD denote division, multiply, and ADD class instructions, respectively. L/S indicates a long operation if set or a short operation if reset. S/C corresponds to a subtract or compare operation. RX OP is set for an RX operation. And SQRT is set for a square root operation.

Figure 8:
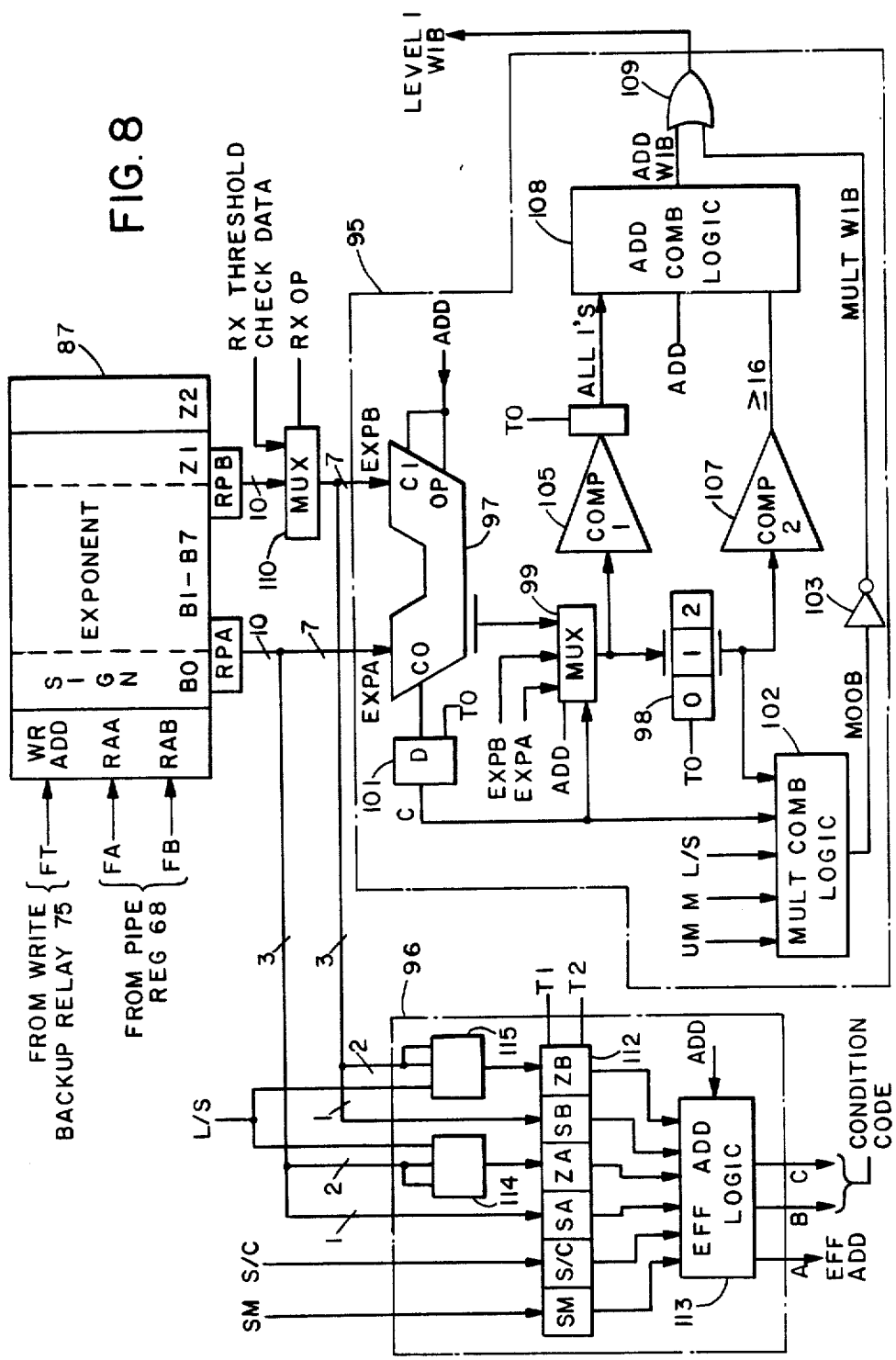
FIG. 8 illustrates exponent threshold check logic and effective add logic used in the structure of FIGS. 7A and 7B.

Use of the threshold check data for level 1 validity response determination is illustrated in FIG. 8. As shown, the array 87 can consist of, for example, a multiport storage element having a single write address (WRADD) port which stores the threshold check data for the just-completed operation at the location corresponding to the address in the FT field of the write backup register 75. This is done by providing a conventional write enable signal and the FT field contents to the array at T0 of the cycle following the cycle in which the instruction is completed. The array 87 is then enabled for reading and the FA and FB fields of the pipe register are provided to it at T1 through T2. At time T1 of the PIPE cycle, the threshold check data stored at the FA and FB addresses is provided through read port A (RPA) and RPB, respectively, of the array 87. If the instruction involves an RX operation (RX OP), the multiplexer 92 gates the RX threshold check data from the data interface block 36. The 7-bit operand exponents of the threshold check data enter a level 1 threshold check circuit 95, while the sign and zero bit data are provided to an effective add tester 96.

The level 1 threshold check circuit 95 consists of a 7-bit adder 97, a 3-bit register 98 that latches the three most significant bits (0, 1, and 2) of the output of the adder 97 at T0, a multiplexer 99, a register 101 that latches the state of the carry-out (C) of the adder 97 at time T0, multiply combination logic 102, an inverter 103, digital latching comparator 105, comparator 107, add combination logic 108, and OR gate 109.

In FIG. 8, the two 7-bit exponents of the operands for the issued instruction in the pipe register 68 are provided to the 7-bit adder. The source of the exponents depends upon the type of operation. If the operation is non-RX, the multiplexer 110 the provides a second exponent from the RPB port of the array 87. Otherwise, the RX OP bit will be set by the instruction decoder 106a, causing the multiplexer 96 to provide the exponent data from the data interface 36.

If the operation is a multiply operation, the ADD bit from the instruction decoder 106a will be reset and the M bit set. The reset condition of the ADD bit causes the adder 97 to conventionally add the 7-bit exponents. The reset bit of the ADD signal further causes the multiplexer 99 to provide the three highest bits of the output of the adder 97 to the register 98. If the addition operation results in a carryout, a bit is provided from the carryout (CO) port of the adder 97 to a register 101. The output of the register 101 is denoted as the carry (C) bit. In a multiply operation, the contents of the registers 98 and 101 are provided to the multiply combination logic 102, together with the M and L/S bits from the decoder 106a. In addition, the underflow mask (UM) of the PSW is also provided to the logic 102. In a multiply operation, the M bit is set, and the state of the L/S bit indicates whether a long or short multiply operation is to be performed. The multiply combination logic 102 is enabled when the M bit indicates that the operation is a multiply; in this event, the logic 102 provides a multiply out-of-bound (MOOB) signal which is set if any of the terms in Table I are true.

TABLE I

| TERM | INDICATION |
|---|---|
| C · 0 | EXPONENT OVERFLOW |
| $\overline{C}$ · $\overline{0}$ · UM | EXPONENT UNDERFLOW |
| C · 0 · $\overline{1}$ · 2 · $\overline{L/S}$ · UM | SHORT RANGE LOWER END |
| C · 0 · $\overline{1}$ · L/S · UM | LONG RANGE LOWER END |

In Table I, C·O indicates that the sum of the operand exponents is at least 192. When the extra bias of 64 involved in a multiply operation is deleted, it will be appreciated that this term predicts that the sum of the exponents exceeds 127, which places it above the upper end of the short and long multiply exponent threshold ranges.

The second term, $\overline{C}$·$\overline{O}$·UM, indicates that the sum of the exponents is less than 64 and that the exponent underflow mask (UM) is absent. Again, removing the extra bias of 64 introduced by adding the exponents in connection with the floating point multiply, it will be appreciated that the resulting exponent cannot be greater than zero. The third and fourth terms of Table I check for the lower ends of the short and long multiply exponent threshold ranges, respectively, while taking into account the extra bias of 64 resulting from the multiply operation.

If any of the terms of Table I are true, the logic 102 will set the out-of-bounds signal; if, on the other hand, none of the Table I terms are true, the out of bounds signal will be reset. The out of bounds signal is inverted by the inverter 103 to give the positive logic sense signal MULT WIB (multiply within bounds). When MULT WIB is set, the exponent of the result of the multiplication operation for the instruction in the pipe register 68 will be within the first exponent threshold range.

If the instruction in the pipe register is an add class instruction, the decoder 106a will set the ADD signal. If the add class operation is a subtract or a compare, the S/C signal provided by the decoder 106 will also be set.

When an add class instruction is in the pipe register, the set state of the ADD signal will cause the adder 97 to invert its operation and perform as a subtracter. The set ADD signal is also provided to the carry-in (CI) port of the adder, which results in the adder 97 effectively operating as a two's complement machine. As will be appreciated by those skilled in the art, a carry-out resulting from two's complement addition of the exponents will occur only if the number in two's complement form is smaller in magnitude than the noncomplemented number. Thus, the carry can be used to identify the larger of the two exponents in an add class operation. Selection of the larger exponent is made by the multiplexer 99 according to the condition of the carry-out signal in register 101. Thus, for an add class operation, the ADD and CARRY-OUT signal will result in the multiplexer 99 providing the most significant three bits of the larger of the exponents to the register 98 and all of the bits of the selected exponent to the latching comparator 105. At the latching comparator 105, the larger exponent is evaluated to see whether it consists of all one's . The result of the comparison is latched by the comparator at time T0 of the SOURCE cycle. At T0 of the source cycle, the upper three bits of the larger exponent are compared in the comparator 107 against a digital representation of the value 16. The add combination logic 108 compares the outputs of the comparators 105 and 107 and activates an add class within bounds signal (ADD WIB) if the results of the comparisons indicate that the exponent is within the first exponent threshold range for add class operations.

The output of the level 1 threshold check circuit 95 is provided through the OR gate 109 as a level 1 within bound signal (WIB).

If the pipe register instruction is an add class instruction, the effective add test circuit 96 is activated by the ADD signal. The effective add test circuit consists of a register 112 and effective add logic. The register 112 receives the sign and zero bits for each operand. The Z1 and Z2 bits for each operand are combined in the gates 114 and 115. The gate 114 provides a signal ZA, which is determined by $ZA = (Z_1 \cdot Z_2) + (\overline{L/S} \cdot Z_1)$. Similarly, the signal $ZB = (Z_1 \cdot Z_2) + (L/S \cdot Z_1)$ indicates whether or not the fraction of operand FB is zero. The sign bits SA and SB retain their usual sense (that is, if the operand is a positive number, the bit has a zero digital value). In the following description, ZA and ZB are referred to as the "zero bits," while SA and SB are denoted as the "sign bits." Finally, the significance mask (SM) from the PSW and the S/C signal from the decoder 1067a are also captured in the register 112. The signals captured in the register 112 are provided to the effective add logic 113, which operates according to Table II.

TABLE II

| SM | S/C | ZA | ZB | SA | SB | A |
|----|-----|----|----|----|----|----|
| 0  | —   | 1  | 1  | —  | —  | 1 |
| —  | 1   | 0  | 0  | 1  | 0  | 1 |
| —  | 1   | 0  | 0  | 0  | 1  | 1 |
| —  | 0   | 0  | 0  | 1  | 1  | 1 |
| —  | 0   | 0  | 0  | 0  | 0  | 1 |
| (ALL OTHER CASES) |  |  |  |  |  | 0 |

As illustrated in FIGS. 7A and 8, the A signal provided by the effective add test circuit 96 indicates that the operation is an effective add operation as defined above.

The first line of Table I permits the setting of the A bit when the significance mask in the PSW has a value of zero and both of the operands are zero. In this case, the result fraction, which can be reliably predicted as zero, will not result in a significance exception since the significance mask bit is also zero. Therefore, an early validity response can be provided together with the predicted condition code. The next four lines of Table II essentially define effective add operations whose result fractions are predictably non-zero. For example, line 2 of Table II is a subtract operation which combines two operands having opposite signs and non-zero fractions. In this case, it will be appreciated that the result operand fraction will have a magnitude equal to the algebraic sum of the two operands and that the sign of the fraction will be negative.

Returning now to FIG. 7A, the outputs of the level 1 threshold check 95 and the effective add test circuit 96 are provided to a level 1 response trigger circuit 116. The level 1 response trigger receives the level 1 WIB signal from the threshold check circuit 95, the A signal from the effective add test circuit 96, the add start and multiply start signals from the contention circuit 89, and the RV bit from the instruction in the pipe register 68. As shown in FIG. 9, the level 1 response trigger circuit 116 consists of response trigger logic 118 and a resettable latch 119. The logic 118 provides a level 1 response according to equation (1).

$$\text{LEVEL 1 RESPONSE} = (\text{ADD ST} \cdot \text{A} \cdot \text{WIB} \cdot \text{PIPE RV}) + (\text{MULT ST} \cdot \text{WIB} \cdot \text{PIPE RV}) \tag{1}$$

The first term of equation (1) is activated when the instruction in the pipe register is an effective add instruction for which a non-zero result is predicted and whose intermediate exponent is in the first exponent threshold range for add class instructions. The second term of equation (1) is activated when the pipe register instruction is a multiply instruction whose intermediate characteristic is within the first exponent threshold range for long or short operations. The level 1 response is initially produced by the logic 118 (FIG. 9) in response to the A and WIB signals, both activated at subcycle T0 of the SOURCE cycle (FIG. 11A). Therefore, the UNLATCHED level 1 response is activated by the logic 118 substantially simultaneously with the A and WIB signals at the T0 subcycle. The signal is latched at the T1 subcycle by the resettable latch 119, where it is held until T1 of the first target cycle following the SOURCE cycle.

Returning to FIG. 7A, the latched level 1 response is provided to an OR gate 120, which feeds another OR gate 121. The level 1 response, if generated, passes through the OR gates 120 and 121 and is provided as the VALIDITY RESPONSE accelerated to level 1.

As can be seen in the level 1 response waveforms of FIG. 11A, the level 1 validity response, if generated, is activated by the operation of the latch 119 at the beginning of the T1 subcycle of the SOURCE cycle and deactivates at the beginning of the T1 subcycle of the TARGET cycle following the SOURCE cycle.

LEVEL 2 AND 3 RESPONSE

Referring now to FIGS. 7B, 11A and 11B, the threshold check data for acceleration of validity response to level 2 or 3 is obtained from the intermediate characteristic registers (ICRs) 125, 126, and 127 in the CSEU 66. The contents of the ICRs represent the intermediate characteristic calculated by circuitry in the CSEU during a floating point operation. Characteristic calculation circuitry is conventional and is not shown or described in this application.

Since, in floating point operations, the intermediate characteristic is typically calculated before arithmetic manipulation of operand fractions, the intermediate characteristic for an instruction to be executed will have been calculated and placed in one of the ICRs by the time the START signal for the corresponding execution unit is generated by the contention logic 89. The START signals which activate the execution units in the FPU calculation block are also used to configure the multiplexer 129. The multiplexer 129 feeds the intermediate characteristic from the selected ICR to the level 2 and 3 threshold check circuit 130. Although, in the preferred embodiment, the threshold check circuit 130 is located in the CSEU 66, it should be evident that this is simply design choice; in another design, the level 2 and 3 threshold check 130 could as easily be located in the control unit 32.

The level 2 and 3 threshold check circuit 130 embodies circuitry that is functionally equivalent to the level 1 threshold check circuitry 95, and provides an intermediate characteristic within bound signal (WIB) if the intermediate characteristic is in the second exponent threshold range.

In addition, a level of effective add test circuit 131, substantially identical to the circuit 96, receives fraction zero and sign bits from the operand bus 44 of the FPU. These signals are conventionally developed in the add class unit 42. The circuit 131 outputs an A signal according to Table II, which is provided together with the execution start signals and the WIB signal for the intermediate characteristic to a level 2 response trigger, circuit 132 and to a level 3 response trigger circuit 133.

The level 2 response trigger provides a level 2 response at the beginning of T1 in the first TARGET cycle following the SOURCE cycle. The level 2 response is generated according to the terms listed in Table III.

when the significance exception mask is unmasked (that is, SM=0). In the preferred embodiment, the level 3 response trigger circuit 133 is enabled during T1 of the STAGE cycle, which, for add class operations, is the third cycle following the PIPE cycle. The level 3 response is enabled effectively by the still-set RV bit in the appropriate target register. In the preferred embodiment, the state of the appropriate target register RV bit is provided by latching the output of the level 2 effective add test circuit 131. It should be evident that the level 3 response trigger circuit 133 could duplicate this function by sensing the actual condition of the RV bit in the appropriate target register.

Finally, assuming that the instruction in the pipeline registers passes to the write target register 74 without having stimulated an accelerated validity response, the level 4 response trigger circuit 135 provides the validity response conventionally when the instruction operation sequence has completed. The level 4 response is provided directly from the trigger circuit 135 through the OR gate 121 as the validity response. As can be appreciated, the response trigger circuits 116, 132, 133, and 135 are essentially gated by the state of the RV bit in the appropriate pipeline register. Therefore, it is essential that the RV bit be reset substantially simultaneously with the generation of a validity response. The RV bit in the pipeline registers is reset whenever one of the response triggers 116, 132, or 133 generates a level response. This ensures that a later response will not be generated. For example, when the level 1 response trigger circuit 116 activates a level 1 response, the output of the OR gate 120 is provided not only to the OR gate 121 but also to a gating circuit controlling the RV field of the SOURCE register 69. Although not illustrated, the gating circuit for the SOURCE register RV field consists, in the preferred embodiment, of a conventional latch whose input port receives the PIPE register RV field contents. The latch is clocked by a gated TL clock. The TL clock gate is controlled by the condition

TABLE III

| LEVEL 2 RESPONSE TERMS | |
|---|---|
| TERM | CONDITION |
| (IC WIB · DIV ST · $\overline{SQRT}$ · $\overline{ZB}$ · SOURCE RV) | DIVIDE BY NON-ZERO |
| (IC WIB · DIV ST · SQRT · SA · SOURCE RV) | SQRT OF (+) |
| (IC WIB · ADD ST · A · SOURCE RV) | EFFECTIVE ADD · NON-ZERO |
| (IC WIB · MULT ST · SOURCE RV) | MULTIPLY WIB |

The first term stimulates the generation of a response for divide operations whose intermediate characteristics are within the second exponent threshold range and which have non-zero divisors. The second term provides a level 2 response for square root operations involving a positive radical. The third term permits a level 2 response for effective add operations which have failed the level 1 response conditions in decision blocks 53 and 54 of FIG. 6. The fourth term responds for multiply operations whose intermediate characteristics are within the second exponent threshold range but which have failed any of the tests in steps 51, 53, or 54 of FIG. 6.

The trigger circuit 132 provides a level 2 response in latched and unlatched form in the same manner as the trigger circuit 116. The latched level 2 response is passed through the OR gates 120 and 121 to condition the validity response signal.

Level 3 response is provided by the level 3 response trigger circuit 133 for add class operations that are effective subtracts, or effective adds with zero results of the RESET signal output from the OR gate 120. In the preferred embodiment, the positive condition of the RESET signal output by the OR gate 120 resets the RV field of every pipeline register. Therefore, it can be appreciated that if the RV bit is set in any of the pipeline registers, a validity response will not have been generated for the associated instruction, meaning that a following instruction will not have been issued. This effectively locks the pipeline registers to a subsequent instruction as long as one instruction with a set RV bit is in the registers. It effectively unlocks the pipeline registers when no register of the pipelined registers has a set RV bit.

Figure 10:
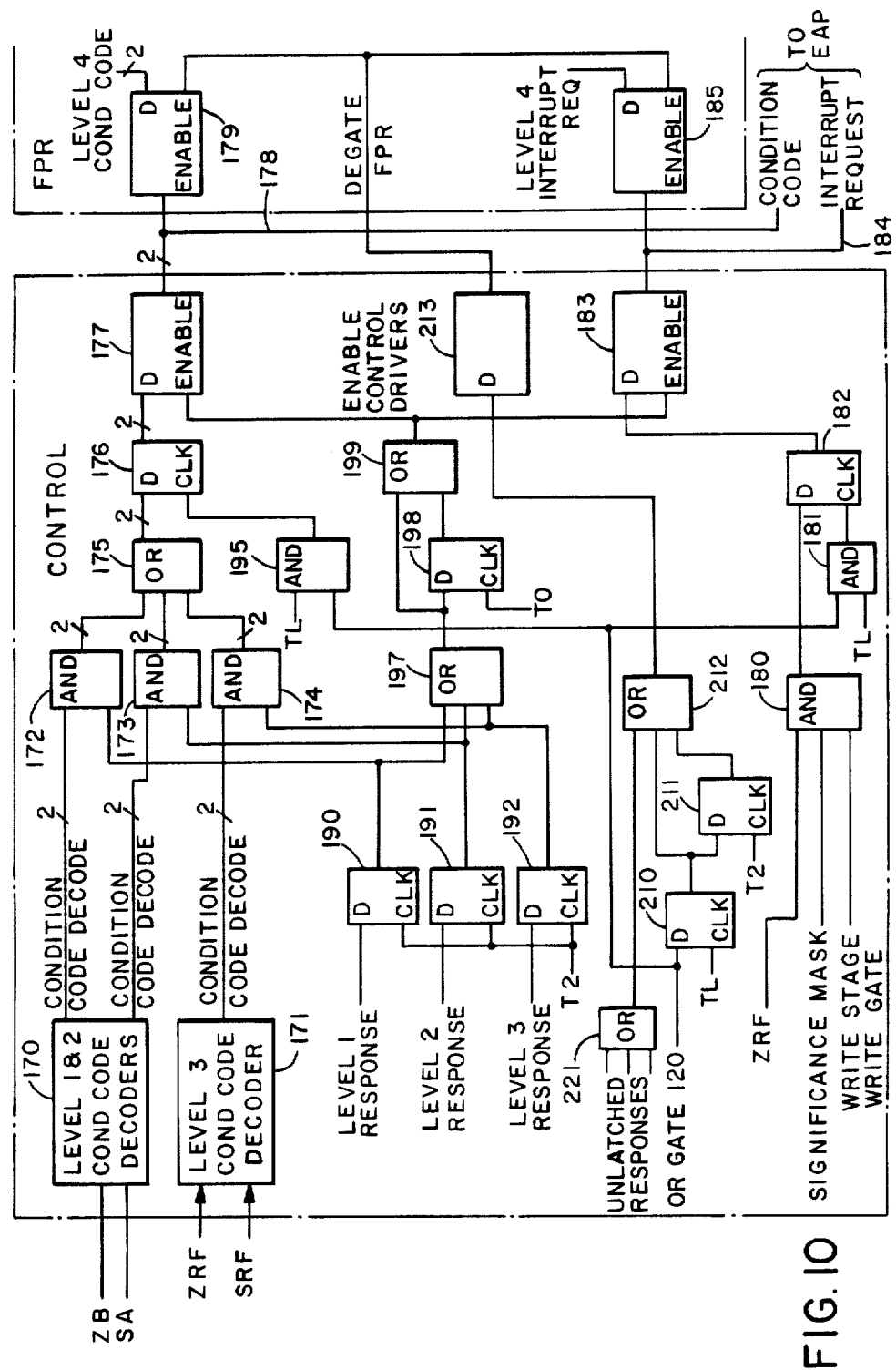
FIG. 10 is a block diagram of circuitry for generating and providing a condition code and interrupt request in synchronism with the accelerated validity response.

The setting of the condition code and generation of an interrupt request in sequence with an accelerated validity response can be understood by reference to FIG. 10, 11A, and 11B. It will be recalled that the condition code is affected by add class operations; therefore, for those effective add operations stimulating a level 1 or level 2 accelerated response, a condition code based upon the predicted output of the result must be generated. A pair of decoders for effective add operations generating level 1 or 2 accelerated validity responses is represented by a single block 170. The level 1 and 2 condition code decoders operate equivalently in response to equivalent signals available in the level 1 and level 2 response circuits of FIG. 7A. Thus, a level 1 condition code decoder has as inputs the ZB and SA signals used by the test circuit. The level 2 condition code decoder operates in response to the corresponding signals used by the level 2 effective add test circuit 131. The operations of the level 1 and 2 decoding are described by the following equations:

$$B = \overline{ZB} \cdot \overline{SA} \quad (2)$$

$$C = \overline{ZB} \cdot SA \quad (3)$$

The level 3 condition code decoder obtains the fraction and sign of the result on the result bus of the FPU and produces a condition code according to Table IV.

TABLE IV

| ZRF | SRF | B | C |
|-----|-----|---|---|
| 0   | 0   | 1 | 0 |
| 0   | 1   | 0 | 1 |
| 1   | 0   | 0 | 0 |
| 1   | 1   | 0 | 0 |

In Table IV the term ZRF is the result fraction sign zero bit, and the term SRF is the result fraction sign bit, both obtained from the add class unit 42 on the result bus 43. The output terms B and C define the 2-bit condition code.

The outputs of the condition code decoders 170 and 171 are fed through three respective AND gates 172, 173, and 174, whose outputs are tied to a single OR gate 175. The output of the OR gate circuit 175 is latched to a condition code register 176, which is provided to a tri-state driver circuit 177. The output of the tri-state driver circuit is tied to a 2-bit wide common bus 178 with the output of another tri-state driver 179 which provides the condition code in the event that the validity response is provided at level 4. The bussed output of the tri-state drivers 177 and 179 is provided as the condition code to the EAP 14.

An interrupt request is generated in synchronism with a level 3 accelerated response by the AND gate 180. The AND gate 180 receives a result fraction all zero indication from the add execution unit 47, the significance mask from the PSW, and a WRITE Stage write gate signal, which is developed conventionally when the instruction to be completed is an add class operation; if the instruction is a COMPARE, for example, the Write Stage write gate signal is inactivated and the interrupt request is suppressed. The output of the AND gate 180 is fed to an interrupt request register 182, whose output feeds a tri-state driver 183. The output of the tri-state driver 183 is conventionally connected to an interrupt request bus 184 provided to the EAP 14. A tri-state driver 185 is also connected to the interrupt bus for generating an interrupt request signal conventionally at level 4, whenever the correct conditions obtain and no previous interrupt request has been generated for the just-completed operation.

The AND gates 172, 173, and 174 are respectively activated by the output of latches 190, 191, and 192. The latches 190, 191, and 192 are connected to receive the latched level 1, level 2, and level 3 responses, respectively. This synchronizes the provision of a condition code generated at a respective accelerated response level with the appropriate response signal for that level. For example, in the LEVEL 1 RESPONSE waveforms of FIG. 11A, the accelerated validity response waveform 220, representing the latched level 1 response input to the OR gate 120, is provided to the EAP 14 beginning with the T1 subcycle of the SOURCE cycle. (Note also that the unlatched level 1 response will have been activated at time T0 of the same cycle, as represented by the dashed portion 221 of the waveform 220.) Once the accelerated validity response (the solid portion of the waveform 220) has been received by the EAP 14, the EAP 14 will sample the condition code and interrupt request lines within the period defined by the positive portion of the waveform 222. The condition code is provided to the EAP 14 through the driver circuit 177, which is enabled by the level 1 response, activated by the latch 190 at T2 of the SOURCE cycle. However, the condition code itself is not provided to the driver circuit 177 until the AND gate 195 is enabled at TL of the SOURCE cycle. Thus, the condition code signal (waveform 224) is output onto the condition code bus 178 to the EAP 14 during the last subcycle of the SOURCE cycle and will be available for sampling by the EAP 14 during the EAPs sampling period (waveform 222). The driver circuit 177 is reset at T0 of the second cycle following the SOURCE cycle when the register 198 is clocked, causing the waveform 224 to fall at transition 225.

The drivers 179 and 185 are disabled by the push-pull driver 213 whenever an accelerated validity response is provided. The drivers 179 and 185 are disabled before the drivers 177 and 183 are enabled in order to permit signal conditions on the condition code and interrupt request buses to settle. This is shown in the level 1 response waveforms of FIG. 11A by waveform 226. The push-pull driver 213 is activated at the earliest possible time by provision of the unlatched responses through the OR gate 221 to the OR gate 212. This permits the driver 213 to output the DEGATE FPR signal at the beginning of the SOURCE cycle. The registers 210 and 211 latch the latched response signal for one and one half cycles following the SOURCE cycle, thereby keeping the drivers 179 and 185 degated for the whole period of time during which an accelerated validity response and possible condition code will be provided to the EAP 14.

Finally, the LEVEL 1 RESPONSE waveforms include a waveform 227, which illustrates the earliest possible time that the FPU 10 can expect an instruction to issue after generation of the accelerated response, waveform 226.

Inspection of the level 2 response waveforms of the FIG. 11A and the circuit of FIG. 7A will confirm that the signal sequence just described for level 1 accelerated response is delayed in time by one FPU cycle.

The level 3 response waveforms are of interest because it is only during level 3 that a possible interrupt request can be generated. In this regard, the interrupt request driver 183 is enabled in the same manner as the condition code driver 177. Therefore, the state of the interrupt request line input to the driver 183 from the register 182 will determine the signal placed on the interrupt request bus. At the conclusion of the first TARGET cycle following the SOURCE cycle, the result fraction will be available from the CSEU, having been placed on the result bus of the FPU by the add class execution unit. At this time the output of the AND gate 180 will assume a state dependent upon the condition of the result fraction and significance mask in the PSW. If the result fraction is all zero and the significance mask is set, the AND gate output will be activated. The activated output will be captured by the register 182 at time TL of the TARGET cycle, causing the driver 183 to drive the interrupt request bus positive until the first cycle following the STAGE cycle.

The level 4 response waveforms are provided as illustrative of how the IBM System/370 provides unaccelerated validity responses at the completion of floating point operations.

While my invention has been shown and described with particular reference to a preferred embodiment, it should be clearly understood by those skilled in the art that changes can be made to it without departing from the spirit and scope of the invention as defined in the following claims.

I claim:

1. An apparatus for providing an accelerated validity response for floating point arithmetic operations performed by a floating point arithmetic unit on pairs of operands in response to floating point arithmetic instructions offered by an instruction issuing entity, said instructions being issued by said instruction issuing entity in a conditionally branched or interruptile sequence in reaction to a validity response normally available following the completion of execution of each floating point arithmetic instruction of the sequence by said floating point arithmetic unit, comprising:

threshold means for numerically combining exponents in the operands of an issued floating point instruction to obtain an intermediate characteristic and comparing said intermediate characteristic to a predetermined threshold range prior to the completion of execution of said issued floating point instruction by said floating point arithmetic unit;

testing logic conditioned by the characteristics and fractions of said operands for determining whether said issued floating point instruction is an effective add instruction which will produce a non-zero result, or an effective subtract operation;

trigger means connected to said threshold means and to said testing logic for issuing an accelerated validity response prior to said completion of execution upon the condition that;

said instruction is a multiply class instruction and said intermediate characteristic is within said threshold range; or said issued floating point instruction is an effective add instruction, said intermediate characteristic is within said threshold range, and the execution of said effective add instruction will produce a non-zero result.

2. The apparatus of claim 1 further including condition code means connected to said testing logic and response to said characteristics and fractions for producing a condition code signal determinative of the order of said sequence prior to said completion of execution.

3. In combination with at least one floating point arithmetic unit which executes floating point instructions using pairs of operands and an instruction-issuing entity which provides instructions in a conditioned sequence, wherein the conditions of said sequence are determined by said instruction-issuing entity in reaction to a validity response indicating the completion of execution of an issued floating point instruction by said floating point arithmetic unit, a validity response accelerator, comprising:

a pipelined number of registers for sequencing issued floating point instructions in synchronism with the execution of said issued floating point instruction by the floating point arithmetic unit;

means for accessing the floating point arithmetic unit to selectively obtain portions of operands or intermediate results of said issued floating point instruction; and response accelerator means responsive to said issued floating point instruction in said registers and to the operand portions and intermediate results obtained for said issued floating point instruction for providing said validity response prior to completion of said issued floating point instruction by said floating point arithmetic unit;

wherein said response accelerator means includes:

threshold evaluation means for combining the exponents in the operands of said issued floating point instruction to obtain an intermediate characteristic and for determining whether said intermediate characteristic is contained in a first exponent threshold range prior to said completion;

instruction classification means responsive to said issued floating point instruction and to the signs and fractions in said operands for determining prior to said completion, whether said issued floating point instruction is an effective add instruction which will produce a non-zero result; and trigger means responsive to said issued floating point instruction, and connected to said threshold evaluation means and to said instruction classification means for issuing a validity response accelerated to a first level preceding said completion if:

said issued floating point instruction is a multiply instruction sand said intermediate characteristic is within said first threshold range; or said issued floating point instruction is an effective add instruction which will produce a non-zero result and said intermediate characteristic is within said first threshold range.

4. The validity response accelerator of claim 3 wherein said threshold evaluation means is further for determining whether said intermediate characteristic is within a second threshold range and said trigger means is further for issuing a validity response accelerated to a second level later than said first level but preceding said completion if:

said issued floating point instruction is a divide instruction with a non-zero divisor and said intermediate characteristic is within said second range; or said issued floating point instruction is square root instruction with a positive radical.

5. The validity response accelerator of claim 3 wherein said trigger means is further for issuing a validity response accelerated to a third level later than said second level but preceding said completion if said issued floating point instruction is an effective subtract operation and said intermediate characteristic is within said second range.

6. In a system which produces a validity response corresponding to the execution by a floating point arithmetic unit of a floating point operation on a pair of operands in response to each of a number of floating point instructions issued by an instruction issuing entity, said instruction issuing entity providing instructions in a sequence conditioned by the execution results of said arithmetic instructions, said system providing a validity response following completion of execution of an issued floating point instruction by said floating point arithmetic unit, a method for accelerating said validity response, said method comprising the steps of:

receiving at said floating point arithmetic unit an issued floating point instruction;

determining the arithmetic operation to be performed in executing said issued arithmetic instruction;

if said issued floating point instruction is an effective add or a multiply class instruction:

combining the unnormalized exponents in the operands of said issued floating point instruction to obtain an intermediate characteristic prior to the completion of execution of said issued floating point instruction by said floating point arithmetic unit;

testing the intermediate characteristic against a first exponent threshold range; and if said intermediate characteristic is contained within said first exponent threshold range, providing said validity response at a source time prior to said completion of execution of said issued floating point instruction; otherwise combining the unnormalized exponents in the operands of said issued floating point instruction to obtain an intermediate characteristic prior to the completion of execution of said issued floating point instruction by said floating point arithmetic unit;

testing said intermediate characteristic against a second exponent threshold range; and if said intermediate characteristics is contained within said second exponent threshold range providing said validity response at a time subsequent to said source time but prior to said completion of execution of said issued point instruction.

* * * * *